(12) United States Patent
Berkovich et al.

(10) Patent No.: US 11,363,221 B2
(45) Date of Patent: Jun. 14, 2022

(54) IMAGE SENSOR POST PROCESSING

(71) Applicant: Facebook Technologies, LLC, Menlo Park, CA (US)

(72) Inventors: Andrew Samuel Berkovich, Redmond, WA (US); Wei Gao, Bothell, WA (US); Xinqiao Liu, Medina, WA (US); Song Chen, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 90 days.

(21) Appl. No.: 16/432,072

(22) Filed: Jun. 5, 2019

(65) Prior Publication Data

US 2019/0379848 A1 Dec. 12, 2019

Related U.S. Application Data

(60) Provisional application No. 62/682,627, filed on Jun. 8, 2018.

(51) Int. Cl.
*H04N 5/355* (2011.01)
*H04N 5/369* (2011.01)
(Continued)

(52) U.S. Cl.
CPC ......... *H04N 5/3692* (2013.01); *H04N 5/3559* (2013.01); *H04N 5/35509* (2013.01);
(Continued)

(58) Field of Classification Search
None
See application file for complete search history.

(56) References Cited

U.S. PATENT DOCUMENTS

| 8,130,298 B2* | 3/2012 | Corson | H04N 5/3745 348/301 |
| 2005/0104978 A1* | 5/2005 | Shinotsuka | H04N 5/361 348/231.99 |

(Continued)

FOREIGN PATENT DOCUMENTS

WO 2017136777 8/2017

OTHER PUBLICATIONS

Kavusi, et al., "Quantitative Study of High-Dynamic-Range Image Sensor Architectures", Proceedings of Society of Photo-Optical Instrumentation Engineers—The International Society for Optical Engineering, vol. 5301, Jun. 2004, pp. 264-275.

(Continued)

*Primary Examiner* — James M Hannett
*Assistant Examiner* — Wesley J Chiu
(74) *Attorney, Agent, or Firm* — Kilpatrick Townsend & Stockton LLP

(57) ABSTRACT

In one example, an apparatus is provided. The apparatus comprises an image sensor configured to generate a first raw output to represent a first intensity of incident light based on a first relationship, and to generate a second raw output to represent a second intensity of incident light based on a second relationship. The apparatus further comprises a post processor configured to: generate a first post-processed output based on the first raw output and based on the first relationship such that the first post-processed output is linearly related to the first intensity based on a third relationship, and to generate a second post-processed output based on the second raw output and based on the second relationship such that the second post-processed output is linearly related to the second intensity based on the third relationship.

23 Claims, 23 Drawing Sheets

(51) Int. Cl.
  *H04N 5/372* (2011.01)
  *H04N 5/378* (2011.01)
  *H04N 5/361* (2011.01)

(52) U.S. Cl.
  CPC ......... *H04N 5/35518* (2013.01); *H04N 5/361* (2013.01); *H04N 5/36963* (2018.08); *H04N 5/372* (2013.01); *H04N 5/378* (2013.01)

(56) References Cited

U.S. PATENT DOCUMENTS

| | | | |
|---|---|---|---|
| 2007/0103569 A1 | 5/2007 | Kawahito | |
| 2008/0001065 A1 | 1/2008 | Ackland | |
| 2008/0055441 A1 | 3/2008 | Altice | |
| 2009/0015879 A1* | 1/2009 | Nose | H04N 5/35518 358/461 |
| 2009/0059040 A1* | 3/2009 | Kamon | H04N 5/35518 348/241 |
| 2010/0091144 A1* | 4/2010 | Hidehiko | H04N 5/361 348/243 |
| 2013/0206959 A1* | 8/2013 | Zhang | H04N 5/361 250/208.1 |
| 2017/0099422 A1 | 4/2017 | Goma et al. | |
| 2017/0099446 A1 | 4/2017 | Cremers et al. | |
| 2017/0272672 A1* | 9/2017 | Tanaka | H04N 5/2355 |
| 2018/0376083 A1* | 12/2018 | Ikuma | G02B 26/10 |
| 2019/0124285 A1* | 4/2019 | Otaka | H04N 5/35527 |
| 2019/0319061 A1* | 10/2019 | Liu | H04N 9/04557 |
| 2020/0021755 A1* | 1/2020 | Toyofuku | H01L 27/146 |

OTHER PUBLICATIONS

PCT/US2019/035783, "International Search Report and Written Opinion", dated Aug. 19, 2019, 11 pages.
Chinese Application No. 201980038967.X, Office Action dated Aug. 27, 2021, 8 pages.
European Application No. 19734540.8, Office Action dated Oct. 13, 2021, 11 pages.

* cited by examiner

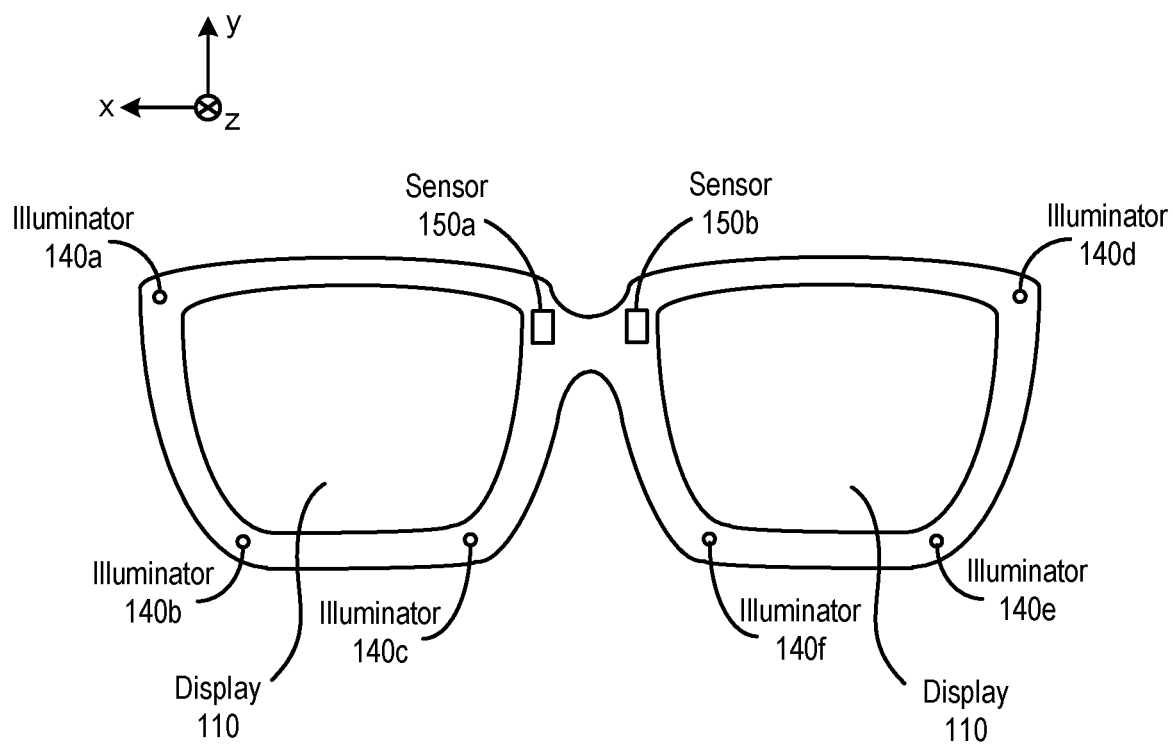
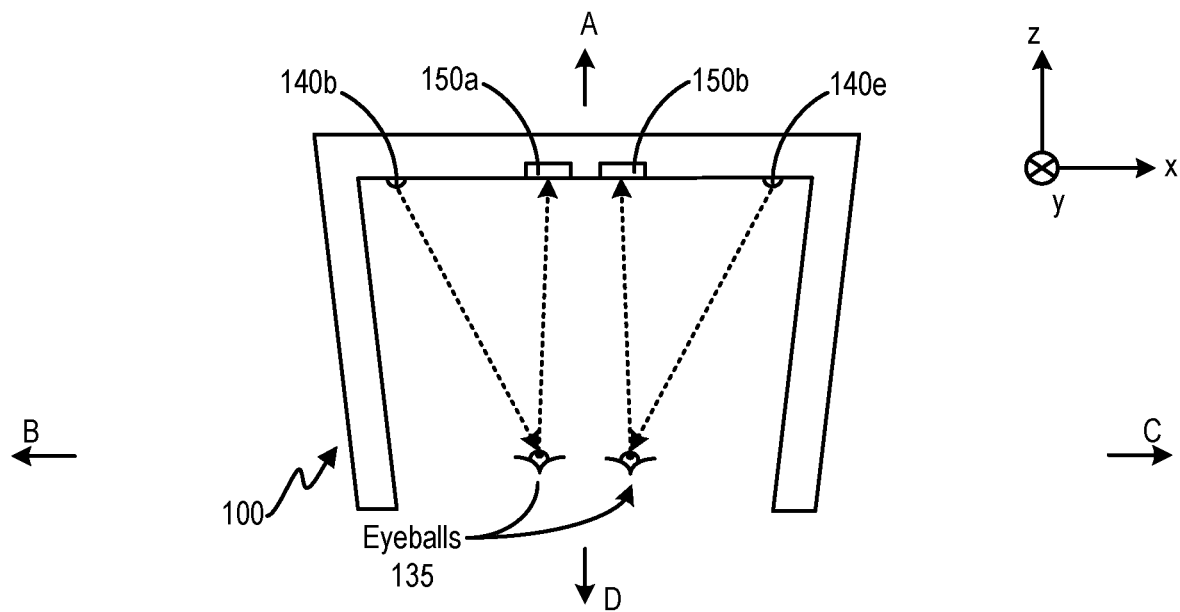
FIG. 1B

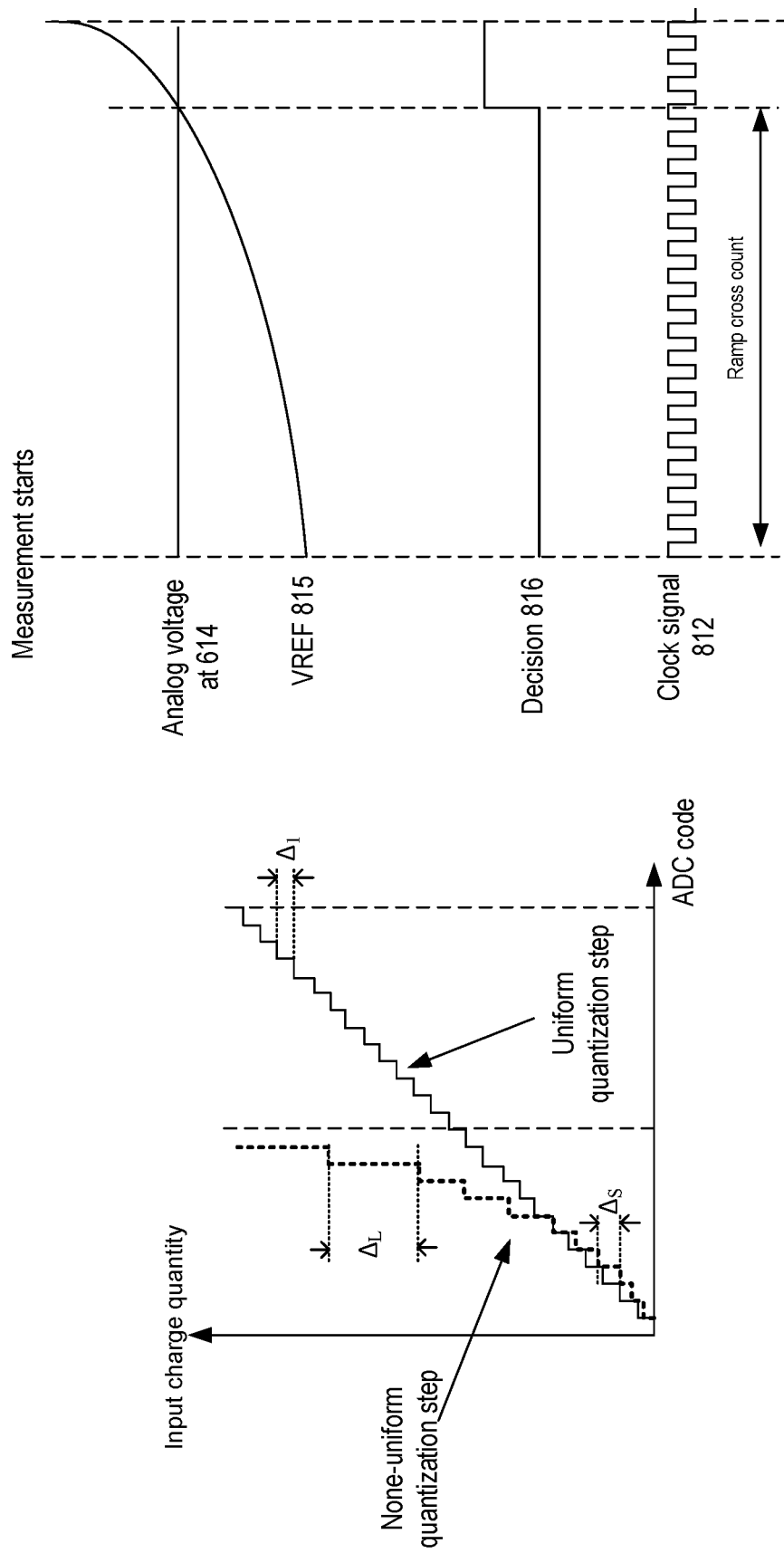

IMAGE SENSOR POST PROCESSING

RELATED APPLICATION

This patent application claims priority to U.S. Provisional Patent Application Ser. No. 62/682,627, filed Jun. 8, 2018, entitled "METHOD AND SYSTEM FOR PROCESSING NON-LINEAR OUTPUT OF PIXEL SENSORS," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a floating node configured as a capacitor to collect the charge generated by the photodiode during an integration period. The collected charge can develop a voltage at the capacitor. The voltage can be buffered and fed to an analog-to-digital converter (ADC), which can quantize the voltage into a digital value representing the intensity of the incident light. The image sensor can generate multiple digital values for different light intensities. The digital values can be provided to support various applications, such as image feature extraction, depth sensing, location determination, etc.

SUMMARY

The present disclosure relates to image sensors. More specifically, and without limitation, this disclosure relates to a pixel cell. This disclosure also relates to post-processing of data generated by the pixel cell.

The present disclosure provides an apparatus for measuring intensity of incident light. In one example, the apparatus comprises an image sensor and a post processor. The image sensor is configured to: generate a first raw output to represent a first intensity of incident light based on a first relationship, and generate a second raw output to represent a second intensity of incident light based on a second relationship. The post processor is configured to: generate a first post-processed output based on the first raw output and based on the first relationship such that the first post-processed output is linearly related to the first intensity based on a third relationship; and generate a second post-processed output based on the second raw output and based on the second relationship such that the second post-processed output is linearly related to the second intensity based on the third relationship.

In some aspects, the first relationship between the first raw output and the first intensity is associated with a first intensity range. The second relationship between the second raw output and the second intensity is associated with a second intensity range. The third relationship is associated with a third intensity range comprising the first intensity range and the second intensity range.

In some aspects, the image sensor comprises a photodiode and a charge storage unit. The photodiode is configured to: generate charge in response to incident light within an integration period and accumulate at least a part of the charge as residual charge until the photodiode saturates. The charge storage unit is configured to accumulate the remaining charge as overflow charge until the charge storage unit saturates.

In some aspects, the third relationship linearly relates a post-processed output with an estimated quantity of charge generated by the photodiode within the integration period.

In some aspects, the first raw output measures a saturation time when the charge storage unit saturates before the integration period ends. The second raw output measures a quantity of the overflow charge accumulated by the charge storage unit within the integration period.

In some aspects, the post processor is configured to: determine, based on the saturation time, a rate of accumulation of the overflow charge by the charge storage unit; determine, based on the rate of accumulation of the overflow charge and the integration period, the estimated quantity of charge generated by the photodiode within the integration period; and determine the first post-processed output based on the estimated quantity of charge.

In some aspects, the post processor is configured to determine the estimated quantity of charge based on a first quantity of dark current received by the charge storage unit and a second quantity of dark current received by the photodiode within the integration period.

In some aspects, the post processor is configured to determine the rate of accumulation of the overflow charge based on a first charge storage capacity of the charge storage unit and a second charge storage capacity of the photodiode.

In some aspects, the post processor is configured to: determine the estimated quantity of charge based on the second raw output and a charge storage capacity of the photodiode; and determine the second post-processed output based on the estimated quantity of charge.

In some aspects, the post processor is configured to determine the estimated quantity of charge based on a first quantity of dark current received by the charge storage unit and a second quantity of dark current received by the photodiode within the integration period.

In some aspects, the first raw output measures a quantity of the overflow charge accumulated by the charge storage unit within the integration period. The second raw output measures a quantity of the residual charge accumulated by the photodiode within the integration period.

In some aspects, the image sensor is configured to generate a third raw output to represent a third intensity of incident light, the third raw output measuring a saturation time when the charge storage unit saturates and is related to the third intensity of the incident light based on a fourth relationship. The post processor is configured to generate a third post-processed output based on the third raw output and based on the fourth relationship such that the third post-processed output is linearly related to the third intensity based on the third relationship.

In some aspects, the charge storage unit has a configurable charge storage capacity. The image sensor is configured to store the overflow charge at the charge storage unit having a first charge storage capacity to generate the first raw output. The image sensor is configured to transfer the residual charge from the photodiode to the charge storage unit having a second charge storage capacity to generate the second raw output. The first post-processed output is generated based on the first charge storage capacity and the second charge storage capacity.

In some aspects, the first post-processed output is generated based on a first quantity of dark current received by the charge storage unit and a second quantity of dark current received by the photodiode within the integration period. The second post-processed output is generated based on the second quantity of dark current received by the photodiode within the integration period.

In some aspects, the post processor comprises one or more lookup tables that maps the first raw output to the first post-processed output and maps the second raw output to the second post-processed output. The post processor is configured to generate the first post-processed output and the second post-processed output based on the one or more lookup tables.

In some aspects, the one or more lookup tables comprises a first lookup table that maps the first raw output to the first post-processed output and a second lookup table that maps the second raw output to the second post-processed output. The post processor is configured to select the first lookup table based on the first intensity and to select the second lookup table based on the second intensity.

In some aspects, the first raw output and the second raw output are generated based on a non-uniform quantization process.

In some examples, a method is provided. The method comprises: generating, by an image sensor, a first raw output to represent a first intensity of incident light based on a first relationship; generating, by the image sensor, a second raw output to represent a second intensity of the incident light based on a second relationship; generating, by a post processor, a first post-processed output based on the first raw output and based on the first relationship such that the first post-processed output is linearly related to the first intensity based on a third relationship; and generating, by the post processor, a second post-processed output based on the second raw output and based on the second relationship such that the second post-processed output is linearly related to the second intensity based on the third relationship.

In some aspects, the method further comprises: generating, by the image sensor, a third raw output to represent a third intensity of incident light, wherein the third raw output measures a saturation time when a charge storage unit of the image sensor saturates and is related to the third intensity of the incident light based on a fourth relationship; and generating, by the post processor, a third post-processed output based on the third raw output and based on the fourth relationship such that the third post-processed output is linearly related to the third intensity based on the third relationship.

In some examples, a non-transitory computer readable medium is provided. The non-transitory computer readable medium stores instructions that, when executed by a hardware processor, causes the hardware processor to: receive, from an image sensor, a first raw output to represent a first intensity of incident light based on a first relationship; receive, from the image sensor, a second raw output to represent a second intensity of the incident light based on a second relationship; generate a first post-processed output based on the first raw output and based on the first relationship such that the first post-processed output is linearly related to the first intensity based on a third relationship; and generate a second post-processed output based on the second raw output and based on the second relationship such that the second post-processed output is linearly related to the second intensity based on the third relationship

BRIEF DESCRIPTION OF THE DRAWINGS

Illustrative embodiments are described with reference to the following figures.

FIG. 1A and FIG. 1B are diagrams of an embodiment of a near-eye display.

FIG. 10A and FIG. 10B illustrate techniques for performing quantization.

Figure 1A:
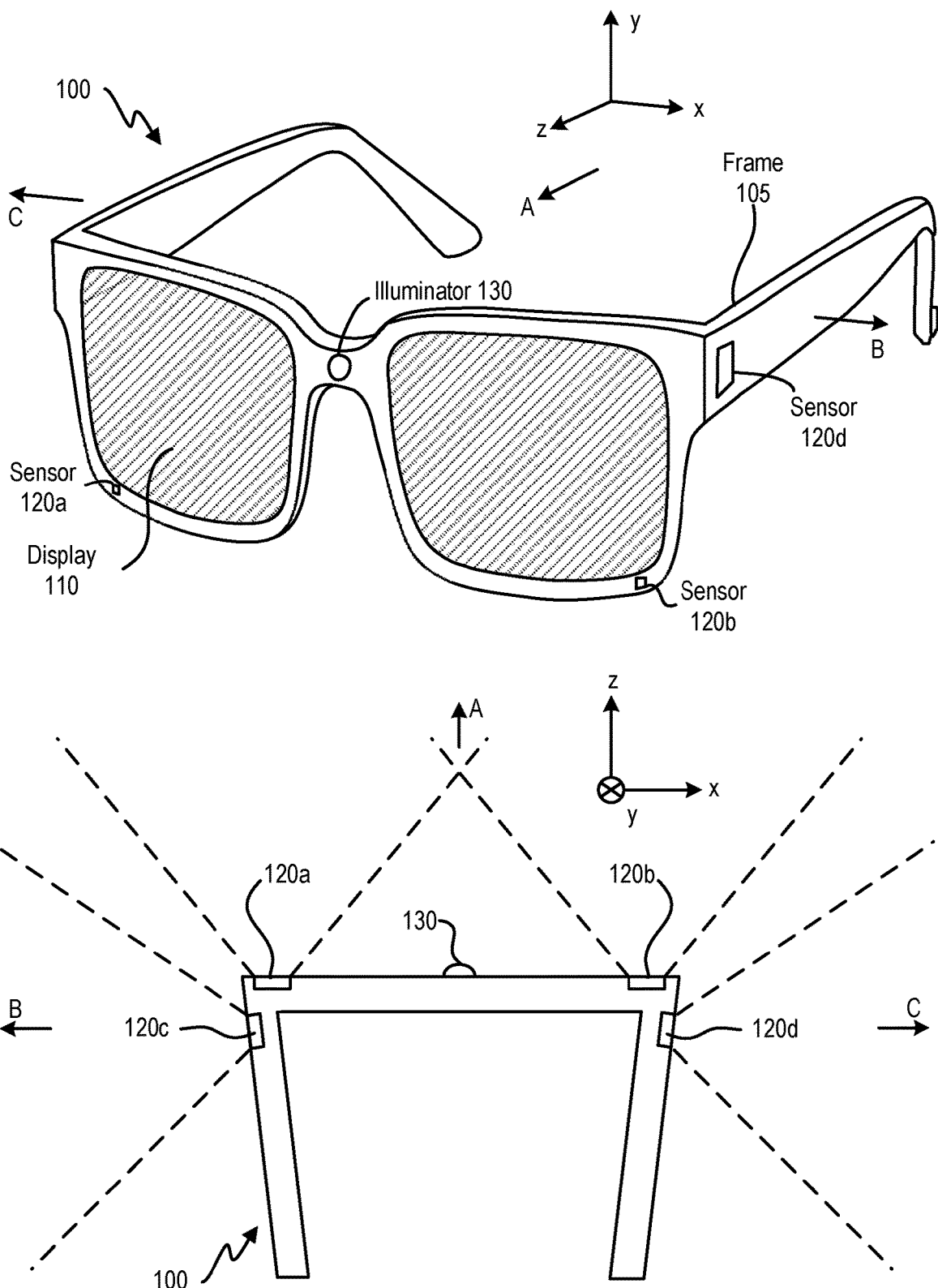

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an integration period. The collected charge can develop a voltage at the capacitor. The voltage can be buffered and fed to an analog-to-digital converter (ADC), which can convert the voltage into a digital value representing the intensity of the incident light.

The digital value generated by the ADC, which reflects a quantity of charge stored at the floating node within a certain period, may correlate to the intensity of the incident light. However, the degree of correlation can be affected by different factors. First, the quantity of charge stored in the floating node can be directly related to the intensity of the incident light until the floating node reaches a saturation limit. Beyond the saturation limit, the floating node may be unable to accept additional charge generated by the photodiode, and the additional charge may be leaked and not stored. As a result, the quantity of the charge stored at the floating node may be lower than the quantity of charge actually generated by the photodiode. The saturation limit may determine an upper limit of the measureable light intensity of the image sensor.

Various factors can also set a lower limit of the measureable light intensity of the image sensor. For example, the charge collected at the floating node may include noise charge not related to the intensity of incident light, as well as dark charge contributed by dark current. Dark current can include leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charge can be capacitive coupling with other circuitries. For example, when the ADC circuitries perform read operations to determine the quantity of charge stored in the floating node, the ADC circuitries can introduce noise charge into the floating node through capacitive coupling.

Besides noise charge, the ADC can also introduce measurement errors in determining the quantity of charge. The measurement errors can degrade the degree of correlation between the digital output and the intensity of the incident light. One source of measurement error is quantization error. In a quantization process, a discrete set of quantity levels can be used to represent a continuous set of quantities of charge, with each quantity level representing a pre-determined quantity of charge. The ADC can compare an input quantity of charge against the quantity levels, determine the quantity level that is closest to the input quantity, and output the determined quantity level (e.g., in the form of digital codes representing the quantity level). Quantization error can occur when there is a mismatch between a quantity of charge represented by the quantity level and the input quantity of charge mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charge. The noise charge, dark charge, as well as the ADC measurement errors, can define a lower limit of the measureable light intensity of the image sensor, whereas the saturation limit may determine an upper limit of the measureable light intensity of the image sensor. A ratio between the upper limit and the lower limit defines a dynamic range, which may set a range of operational light intensities for the image sensor.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on this physical image data, the VR/AR/MR system may generate and update virtual image data for displaying to the user via the near-eye display, to provide an interactive experience to the user. For example, the VR/AR/MR system may update the virtual image data based the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficiently high speed to allow tracking of the user's location, orientation, gaze point, etc. Image sensors with relatively limited dynamic ranges and which generate images at relatively low speed may not be suitable for such a wearable VR/AR/MR system.

This disclosure relates to a pixel cell that can provide extended dynamic range. The pixel cell may include a photodiode, a charge storage unit, a transistor configured as a transfer gate between the photodiode and the charge storage unit, and a processing circuit. The photodiode can generate charge responsive to incident light within an integration period and store at least some of the charge as residual charge until the photodiode saturates. The charge storage unit can be a floating drain of the transistor, a metal capacitor, a Metal-Oxide-Semiconductor (MOS) capacitor, or any combination thereof. The charge storage unit can store overflow charge, which is charge transferred from the photodiode when the photodiode saturates and cannot store additional charge, to develop a first voltage. The charge storage unit may include a floating drain node.

The processing circuit can measure the intensity of the incident light received by the photodiode within the integration period by performing multiple modes of measurement. In a first mode of measurement, the processing circuit can perform a quantization process by comparing the first voltage against a first ramping threshold voltage to generate a first decision. When the first decision indicates that the first voltage crosses the first ramping threshold voltage, a first count value can be captured from a counter and stored in a memory. The first count value can represent a measurement of the time it takes for the first ramping threshold voltage to cross the first voltage, which can also represent a result of quantizing the overflow charge stored in the charge storage unit. The quantity of the overflow charge can be proportional to the intensity of the incident light. For the rest of the disclosure, the first mode of measurement may be referred to as "FD ADC" operation.

The processing circuit can transfer the residual charge from the photodiode to the charge storage unit to develop a second voltage for a second mode of measurement. In the second mode of measurement, the processing circuit can perform another quantization process by comparing the second voltage against a second ramping threshold voltage to generate a second decision. When the second decision indicates that the first crosses the second ramping reference voltage, a second count value can be captured from the counter and stored in the memory. The second count value can represent a measurement of the time it takes for the second ramping threshold voltage to cross the second voltage, which also represents a result of quantizing the residual charge stored in the charge storage unit. The quantity of the residual charge can be proportional to the intensity of the incident light. In some examples, to increase the charge-to-voltage gain which can reduce the quantization error, the capacitance of the charge storage unit can be reduced when storing the residual charge. For the rest of the disclosure, the second mode of measurement may be referred to as "PD ADC" operation.

In some embodiments, the processing circuit can also perform a third mode of measurement. In the third mode of measurement, the processing circuit can compare the first voltage with a static threshold voltage representing a saturation limit of the charge storage unit to generate a third decision. When the third decision indicates that the charge storage unit reaches or exceeds the saturation limit, a third count value can be captured from the counter and stored in the memory. The third count value can represent a measurement of the time it takes for the charge storage unit to become saturated, and the duration of time can be inversely proportional to the intensity of the incident light. For the rest of the disclosure, the third mode of measurement may be referred as time-to-saturation (TTS) measurement operation. In some examples, the third mode of measurement can be performed before the first mode of measurement.

The different modes of measurements can be targeted for different light intensity ranges, and the processing circuit can output one of the first, second, or third count values from the memory to represent the intensity of the incident light based on which light intensity range the incident light belongs to. The first mode of measurement can be targeted at a medium light intensity range for which the photodiode is expected to reach full capacity and saturates. The second mode of measurement can be targeted at a low light intensity range for which the photodiode is not expected to saturate. The third mode of measurement can be targeted at a high light intensity range for which the charge storage unit saturates. Based on an intensity range of the incident light, the processing circuit can select one of the first, second, or third count values from the memory to represent the intensity of the incident light.

The multi-mode measurement operation described above can extend the dynamic range of the light intensity measurement by a pixel cell. Specifically, the TTS measurement operation allows measurement of high light intensity beyond the intensity level that saturates the charge storage unit saturates, which can extend the upper limit of the dynamic range. Moreover, the PD ADC operation measures residual charge stored in the photodiode for low light intensity. As the photodiode typically receives very little dark current, the magnitude of dark charge caused by dark current can remain small with respect to the real signal caused by the incident light, which can reduce the detectable incident light intensity and push down the lower limit of the dynamic range.

Although the multi-mode measurement operations can extend the dynamic range of a pixel cell, the raw outputs (e.g., count values) of the image sensor from each mode of measurement operations can have a different relationship with respect to the light intensity represented by the count value. For example, the count value from the TTS mode represents a time-to-saturation, which is typically inversely proportional to or is at least non-linear with respect to incident light intensity, whereas the count values from the FD ADC and PD ADC operations measure a quantity of charge and are generally linear with respect to the incident light intensity. Moreover, the count values from the FD ADC and the PD ADC operations can have different linear relationships with respect to the incident light intensity. This can be due to, for example, the FD ADC operation measuring the overflow charge and not the entirety of the charge generated by the photodiode (which includes the residual charge) within the integration period, whereas the PD ADC operation measures the residual charge which can be the entirety of the charge generated by the photodiode within the integration period if the photodiode does not saturate. Moreover, as described above, the capacitance of the charge storage unit for the PD ADC operation can be reduced with respect to the FD ADC operation to increase the charge-to-voltage conversion rate and to reduce quantization error. As both the FD ADC and PD ADC operations measure the charge based on quantizing the voltage at the charge storage unit, the different capacitances of the charge storage unit can result in different linear relationships between the charge (which reflects the light intensity) and the count value for FD ADC and PD ADC operations.

The different relationships between count value and the light intensity among the different modes of operations can pose a problem for an application that uses the count values to determine the incident light intensities. The application typically only receives the count values and no other indications of which modes of operations (or which light intensity range) the count values belong to, and may rely on the count values having a uniform relationship with respect to the light intensity across the entire dynamic range. Moreover, some applications that rely on image feature extraction, such as SLAM, may rely on the count values having a uniform relationship with respect to light intensity to determine differences between count values of neighboring pixels, and to extract image features based on the differences.

Such applications may not be able to work properly with the count values output from the aforementioned multi-mode measurement operations without additional post-processing.

This disclosure proposes several techniques that can address at least some of the issues above. In some examples, an apparatus comprises an image sensor and a post processor. The image sensor may include a photodiode configured to generate charge in response to incident light within an integration period and accumulate at least a part of the charge as residual charge until the photodiode saturates. The image sensor may further include a charge storage unit configured to accumulate the remaining charge as overflow charge until the charge storage device saturates. The image sensor may also include a quantizer to quantize the residual charge or the overflow charge to generate a raw output to represent an intensity of the incident light within the integration period. The quantizer can generate a first raw output to represent a first intensity of the incident light based on a first relationship, and a second raw output to represent a second intensity of the incident light based on a second relationship. The first raw output can measure, for example, a saturation time when the charge storage unit is saturated by the overflow charge before the integration period ends, with the saturation time being related to the first intensity based on the first relationship. The second raw output can measure a quantity of charge accumulated within the integration period (e.g., a quantity of the overflow charge accumulated by the charge storage unit, a quantity of the residual charge accumulated by the photodiode, etc.), with the quantity of charge being related to the second intensity based on the second relationship.

The post processor can generate a first post-processed output based on the first raw output and based on the first relationship such that the first post-processed output is linearly related to the first intensity based on a third relationship. The post processor can also generate a second post-processed output based on the second raw output and based on the second relationship such that the second post-processed output is linearly related to the second intensity based on the third relationship.

Specifically, the third relationship can linearly relate a post-processed output to an estimated quantity of charge generated by the photodiode within the integration. To generate the first post-processed output, the post-processor can determine, based on the saturation time represented by the first raw output from the image sensor, a rate of accumulation of the overflow charge by the charge storage unit, and then determine, based on the rate of accumulation of the overflow charge and the integration period, an estimated quantity of charge generated by the photodiode within the integration period. The first post-processed output can then be determined based on the estimated quantity of charge. Moreover, in a case where the second raw output represents a measurement of the overflow charge accumulated by the charge storage unit within the integration period, the post-processor can determine the estimated quantity of charge generated by the photodiode within the integration period by combining the second raw output with the charge storage capacity of the photodiode. The post-processor can also determine the estimated quantity of charge based on adding a quantity of estimated dark charge accumulated by the charge storage unit and by the photodiode within the integration period. Moreover, in a case where the image sensor reduces the charge storage capacity of the charge storage unit for read out and quantization of the residual charge and increases the charge storage capacity of the charge storage unit for read out and quantization of overflow charge, the raw outputs based on the measurement of the overflow charge can be scaled to account for the different charge storage capacities.

In some examples, the post processor can include hardware circuits, such as a digital signal processor, a general purpose central processing unit (CPU), etc., that can execute software instructions to generate the first and second post-processed outputs based on the techniques described above. In some examples, the post processor can include one or more lookup tables (LUT) that map different raw outputs to different post-processed outputs, and the post processor can provide the first and second post-processed outputs based on the mapping in the lookup tables. The lookup tables can be used when, for example, the quantizer employs a non-uniform quantization process to generate the first and second raw outputs, and a close form solution does not exist to map the first relationship and the second relationship to the third relationship.

Examples of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
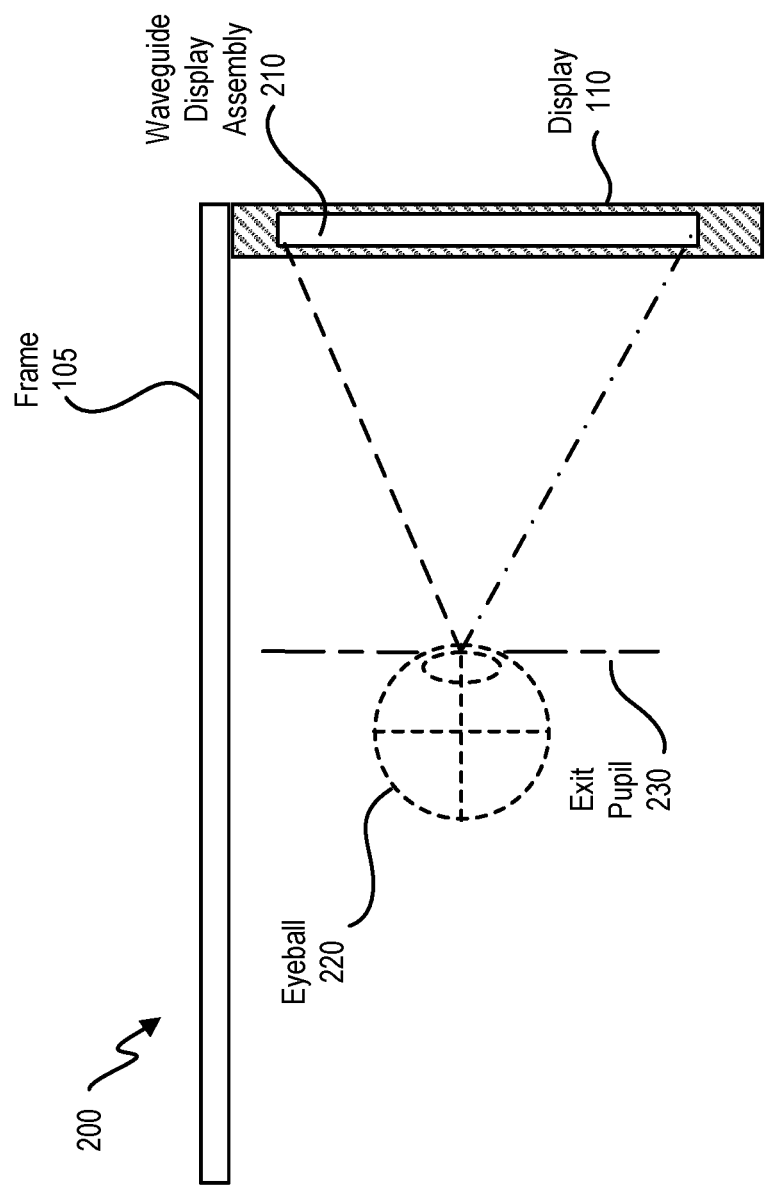
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
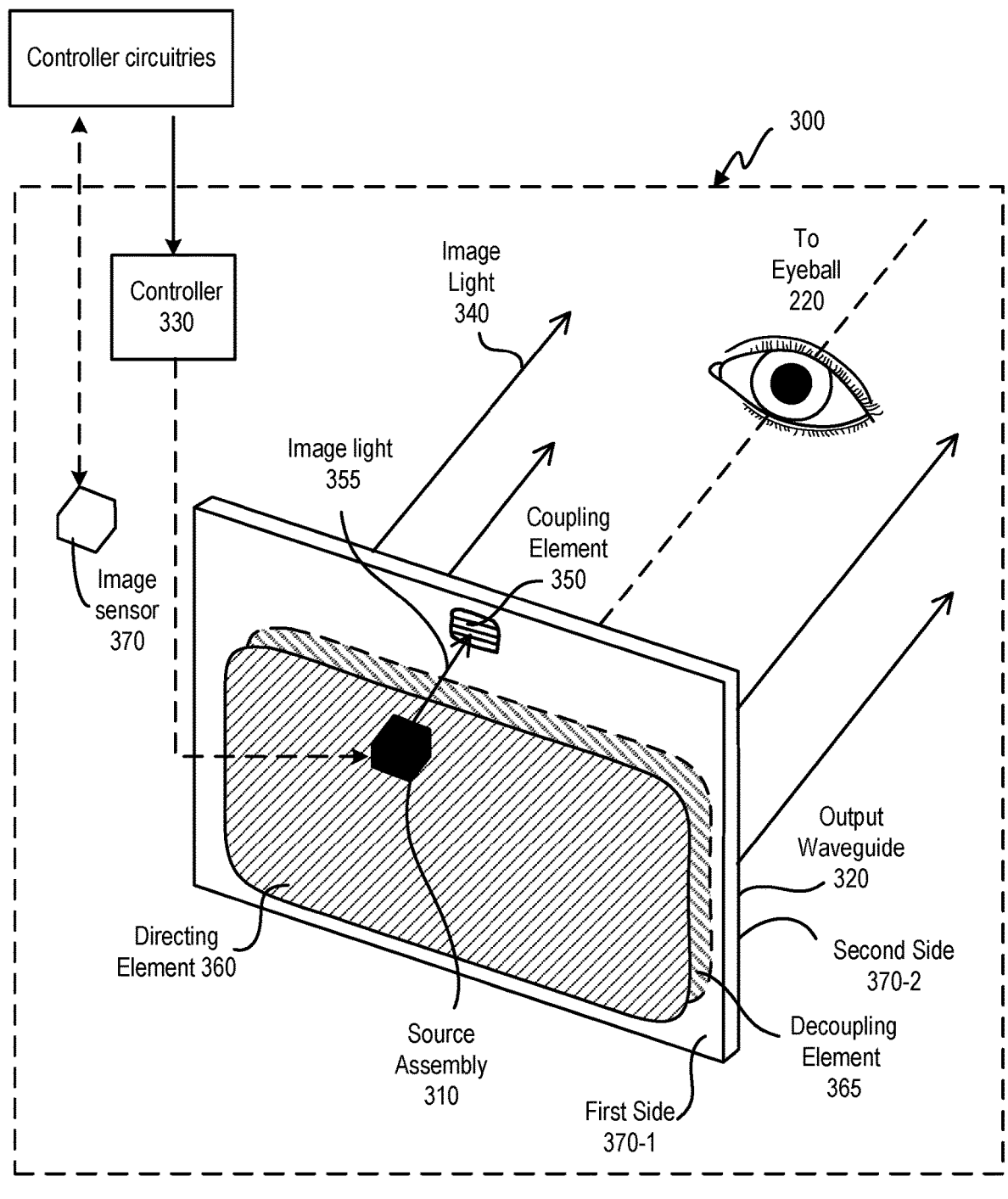
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
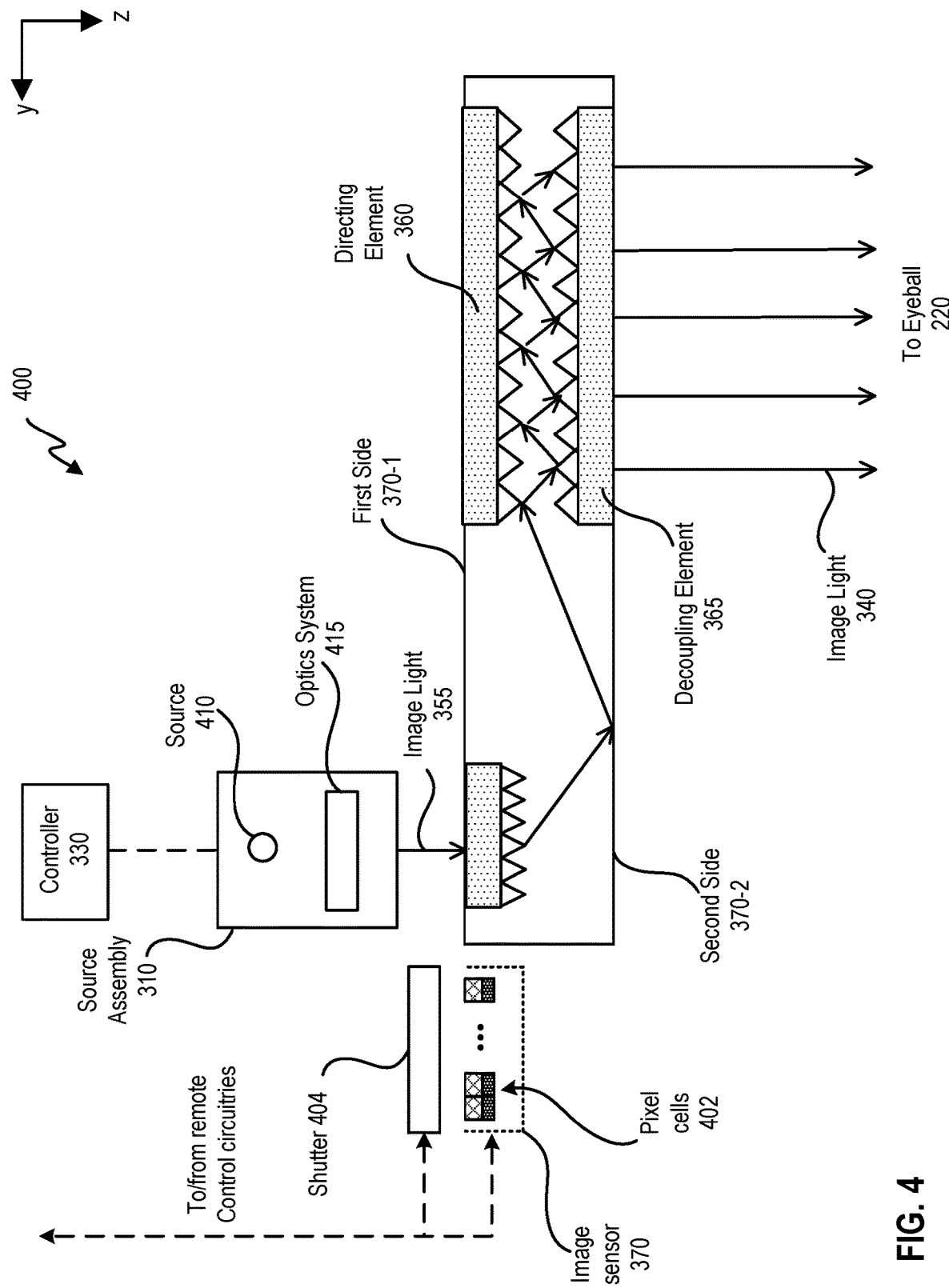
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an integration period. During the integration period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
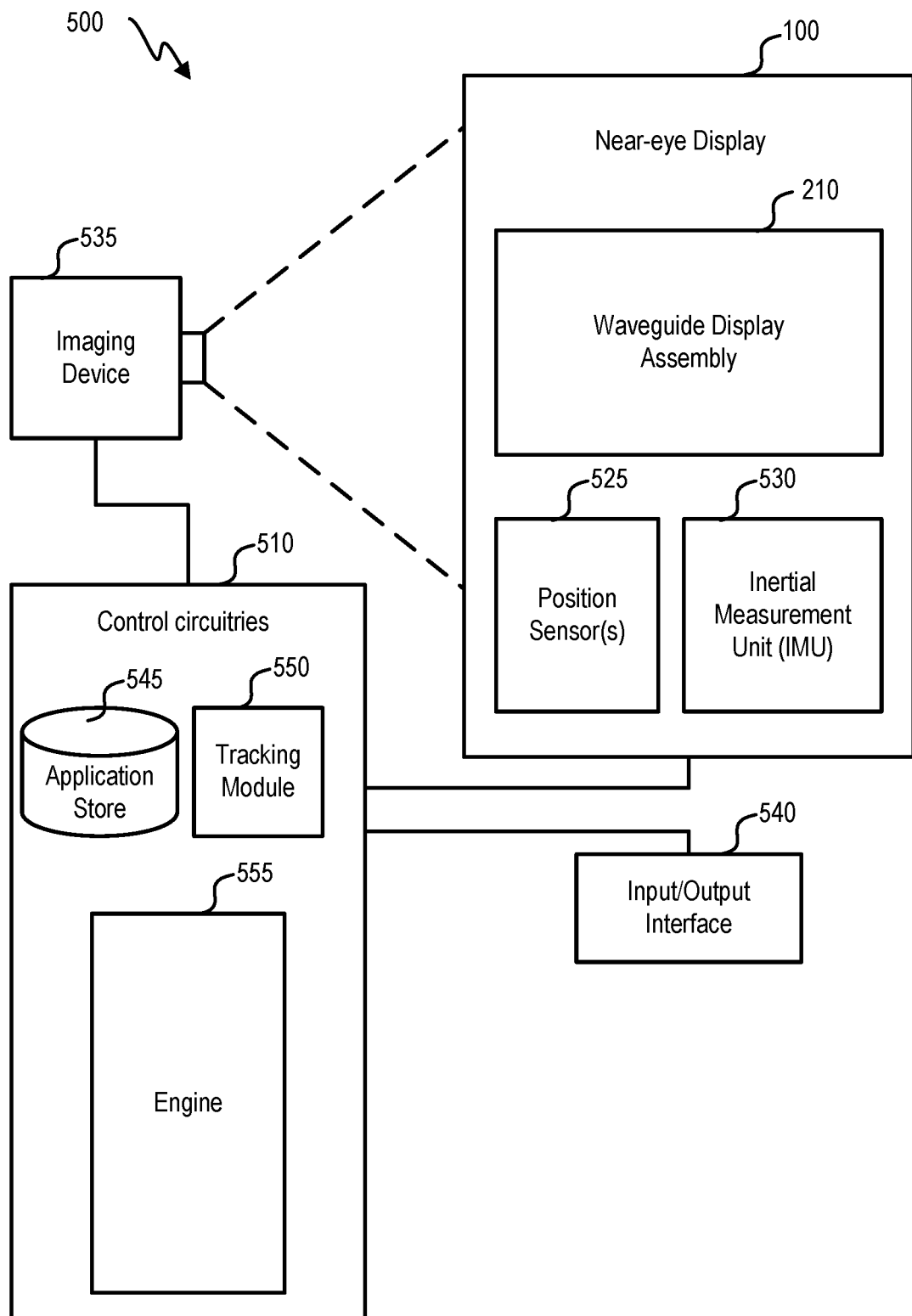
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
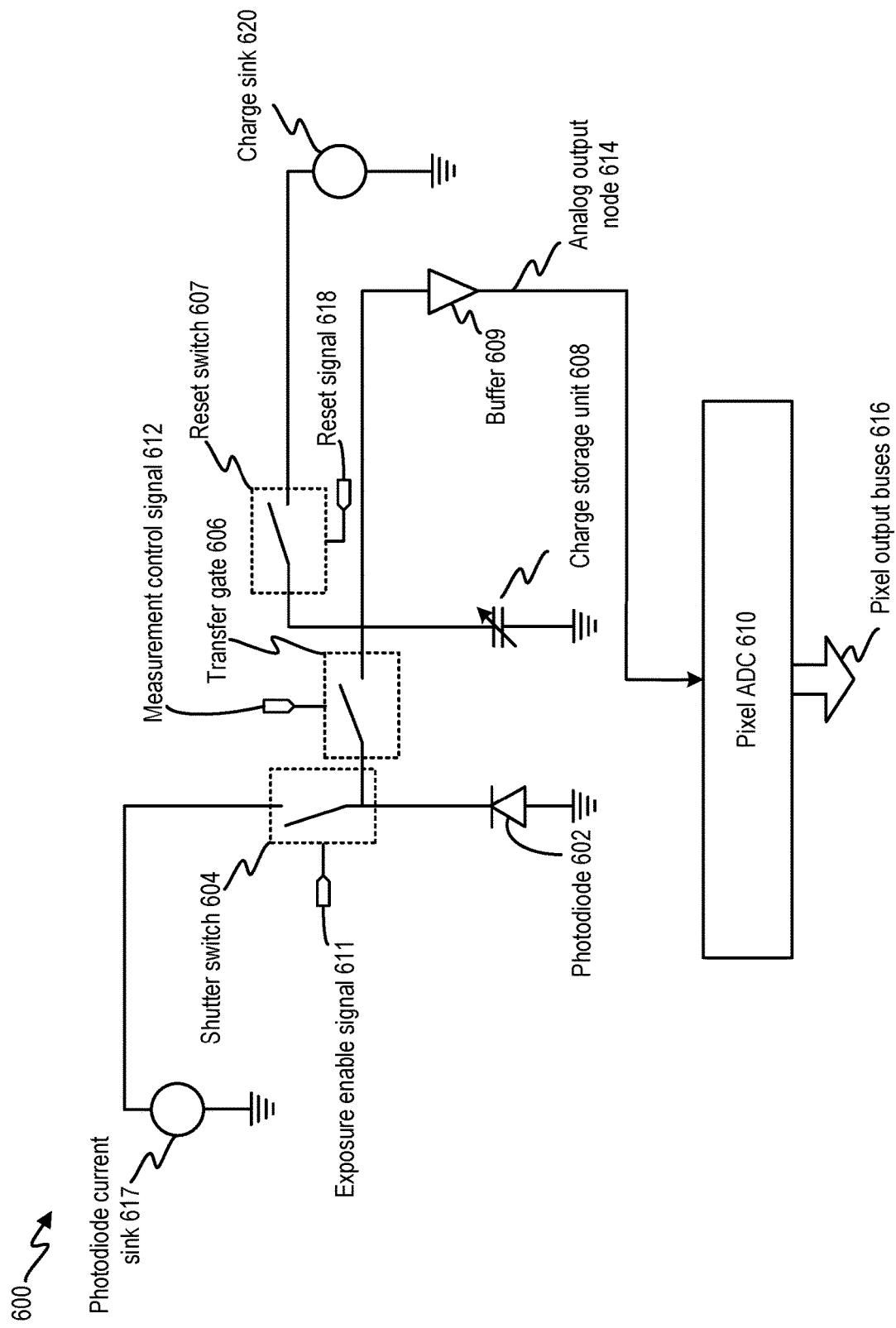
FIG. 6 illustrates block diagrams of embodiments of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602 as well as processing circuits including a shutter switch 604, a transfer gate 606, a reset switch 607, a charge storage unit 608, a buffer 609, and a pixel ADC 610.

In some embodiments, photodiode 602 may include, for example, a P-N diode, a P-I-N diode, a pinned diode, etc. Photodiode 602 can generate charge upon receiving light, and the quantity of charge generated can be proportional to the intensity of the light. Photodiode 602 can also store some of the generated charge until the photodiode saturates, which occurs when the well capacity of the photodiode is reached. Moreover, each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an integration period of pixel cell 600. During the integration period, shutter switch 604 can be disabled (turned off) by exposure enable signal 611, which allows photodiode 602 to store the generated charge and, when photodiode 602 saturates, allows the overflow charge to flow to charge storage unit 608. At the end of the integration period, shutter switch 604 can be enabled to steer the charge generated by photodiode 602 into photodiode current sink 617. Moreover, reset switch 607 can also be disabled (turned off) by reset signal 618, which allows charge storage unit 608 to accumulate the charge. Charge storage unit 608 can be a device capacitor at a floating terminal of transfer gate 606, a metal capacitor, a MOS capacitor, or any combination thereof. Charge storage unit 608 can be used to store a quantity of charge, which can be measured by pixel ADC 610 to provide a digital output representing the incident light intensity. After a mode of measurement completes, reset switch 607 can be enabled to empty the charge stored at charge storage unit 608 to charge sink 620, to make charge storage unit 608 available for the next measurement.

Figure 7:
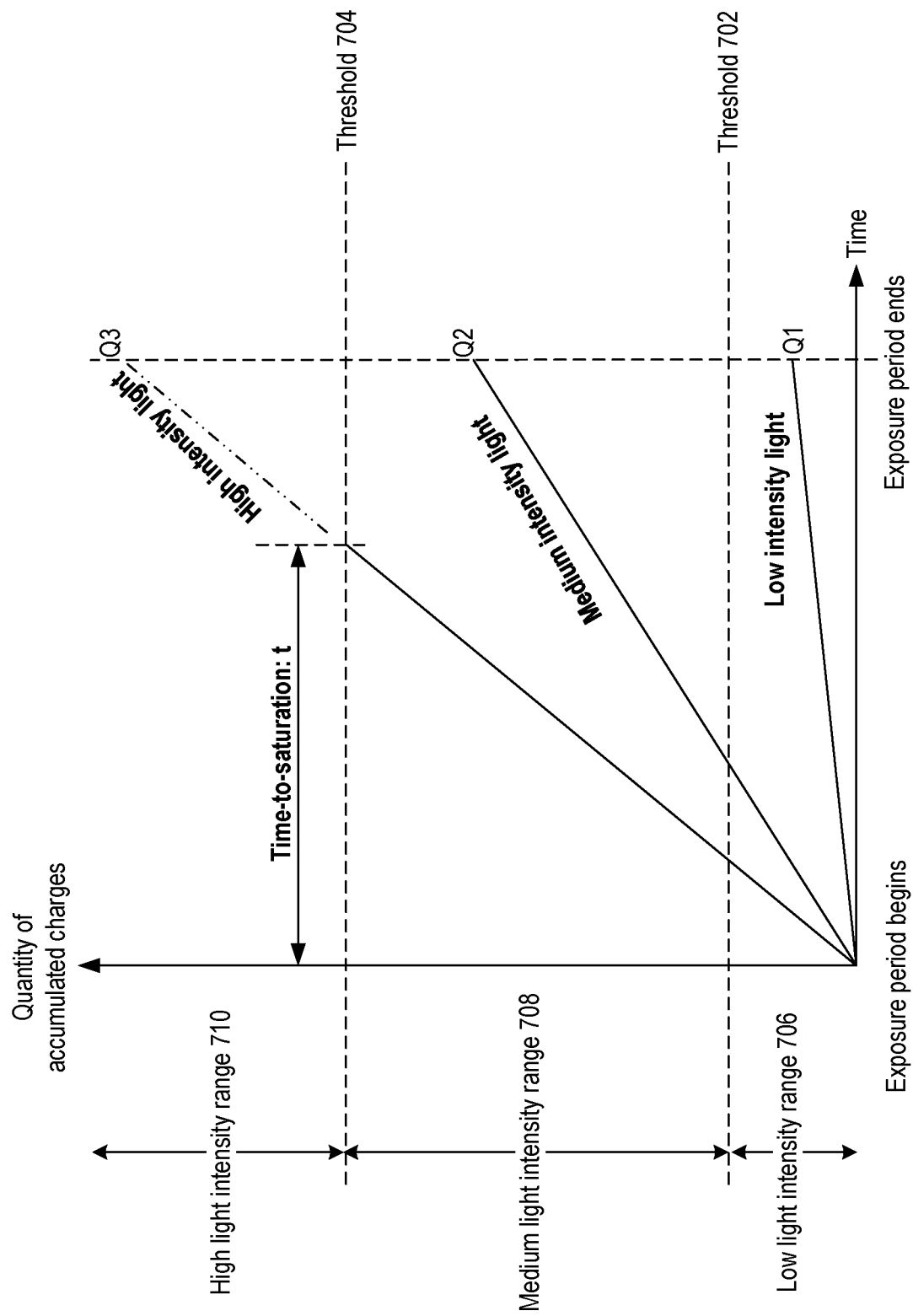
FIG. 7 illustrates operations for determining light intensities of different ranges by embodiments of FIG. 6.

Reference is now made to FIG. 7, which illustrates a quantity of charge accumulated with respect to time for different light intensity ranges. The total quantity of charge accumulated at a particular time point can reflect the intensity of light incident upon photodiode 602 during an integration period. The quantity can be measured when the integration period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within medium light intensity range 710. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and charge storage unit 608. For example, low light intensity range 706 can be defined such that the total quantity of charge stored in photodiode 602, at the end of the integration period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in charge storage unit 608, at the end of the integration period, is below or equal to the storage capacity of the measurement capacitor, and threshold 704 can be based on the storage capacity of charge storage unit 608. Typically threshold 704 is also set to be based on a scaled storage capacity of charge storage unit 608 to ensure that when the quantity of charge stored in charge storage unit 608 is measured for intensity determination, the measurement capacitor does not saturate, and the measured quantity also relates to the incident light intensity. As to be described below, thresholds 702 and 704 can be used to detect whether photodiode 602 and charge storage unit 608 saturate, which can determine the intensity range of the incident light and the measurement result to be output.

In addition, in a case where the incident light intensity is within high light intensity range 710, the total overflow charge accumulated at charge storage unit 608 may exceed threshold 704 before the integration period ends. As additional charge is accumulated, charge storage unit 608 may reach full capacity before the end of the integration period, and charge leakage may occur. To avoid measurement error caused due to charge storage unit 608 reaching full capacity, a time-to-saturation measurement can be performed to measure the time duration it takes for the total overflow charge accumulated at charge storage unit 608 to reach threshold 704. A rate of charge accumulation at charge storage unit 608 can be determined based on a ratio between threshold 704 and the time-to-saturation, and a hypothetical quantity of charge (Q3) that could have been accumulated at charge storage unit 608 at the end of the integration period (if the capacitor had limitless capacity), can be determined by extrapolation according to the rate of charge accumulation. The hypothetical quantity of charge (Q3) can provide a reasonably accurate representation of the incident light intensity within high light intensity range 710.

Referring back to FIG. 6, transfer gate 606 can be controlled by a measurement control signal 612 to control the charge accumulations at residual charge capacitor 603 and charge storage unit 608 for different light intensity ranges as described above. To measure high light intensity range 710 and medium light intensity range 708, transfer gate 606 can be controlled to operate in a partially turned-on state. For example, the gate voltage of transfer gate 606 can be set based on a voltage developed at photodiode 602 corresponding to the charge storage capacity of the photodiode. With such arrangements, only overflow charge (e.g., charge generated by the photodiode after the photodiode saturates) will transfer through transfer gate 606 to reach charge storage unit 608, to measure time-to-saturation (for high light intensity range 710) and the quantity of charge stored in charge storage unit 608 (for medium light intensity range 708). Moreover, to measure low light intensity range 706, transfer gate 606 can be controlled in a fully turned-on state to transfer the charge stored in photodiode 602 to charge storage unit 608, to measure the quantity of the charge stored in photodiode 602.

The charge accumulated at charge storage unit 608 can be sensed by buffer 609 to generate a replica of the analog voltage (but with larger driving strength) at analog output node 614. The analog voltage at analog output node 614 can be converted into a set of digital data (e.g., comprising logical ones and zeros) by pixel ADC 610. The analog voltage developed at charge storage unit 608 can be sampled and digital output can be generated before the end of the integration period (e.g., for medium light intensity range 708 and high light intensity range 710), or after the integration period (for low light intensity range 706). The digital data can be transmitted by a set of pixel output buses 616 to, for example, control circuitries 510 of FIG. 5, to represent the light intensity during the integration period.

In some examples, the capacitance of charge storage unit 608 can be configurable to improve the accuracy of light intensity determination for a low light intensity range. For example, the capacitance of charge storage unit 608 can be reduced when charge storage unit 608 is used to measure the residual charge stored at residual charge capacitor 603. The reduction in the capacitance of charge storage unit 608 can increase the charge-to-voltage conversion ratio at charge storage unit 608, such that a higher voltage can be developed for a certain quantity of stored charge. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charge corresponding to the minimum voltage difference can be reduced, which in turn reduces the lower limit of a measurable light intensity by pixel cell 600 and extends the dynamic range. On the other hand, for medium light intensity, the capacitance of charge storage unit 608 can be increased to ensure that the charge storage unit 608 has sufficient capacity to store a quantity of charge up to, for example, the quantity defined by threshold 704.

Figure 8:
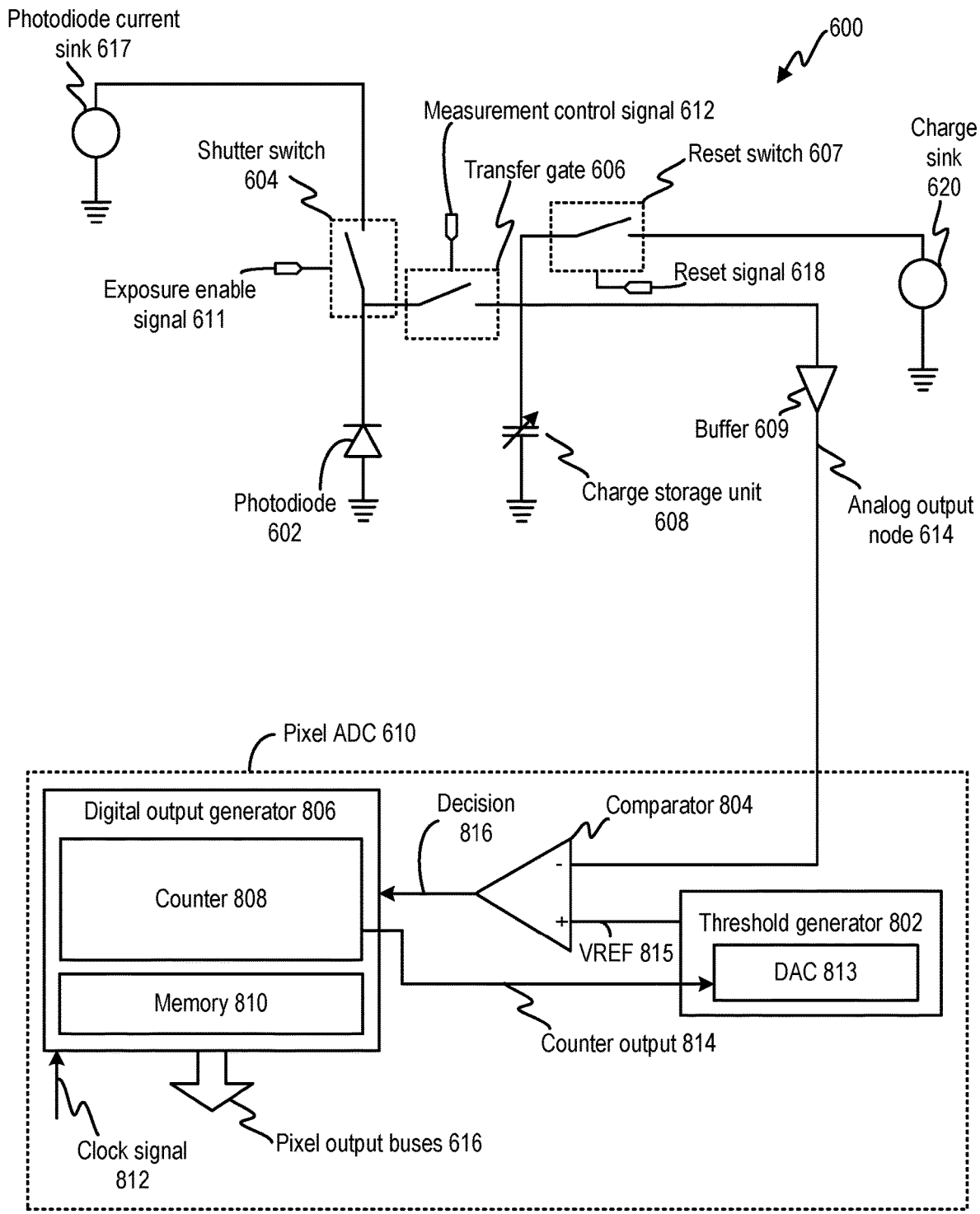
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory 810. Counter 808 can generate a set of count values based on a free-running clock signal 812, whereas memory 810 can store at least some of the count values (e.g., the latest count value) generated by counter 808. In some embodiments, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, at least part of digital output generator 806, such as counter 808, can be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

Figure 9B:
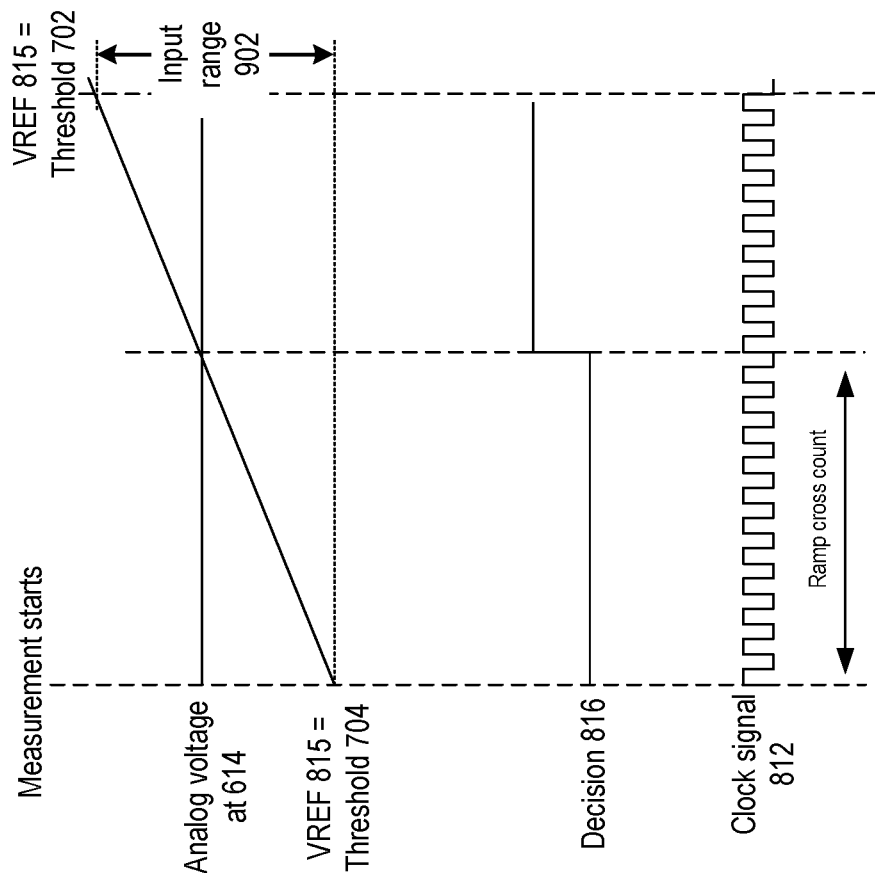
FIG. 9A and FIG. 9B illustrate example methods for determining a light intensity.
Figure 9A:
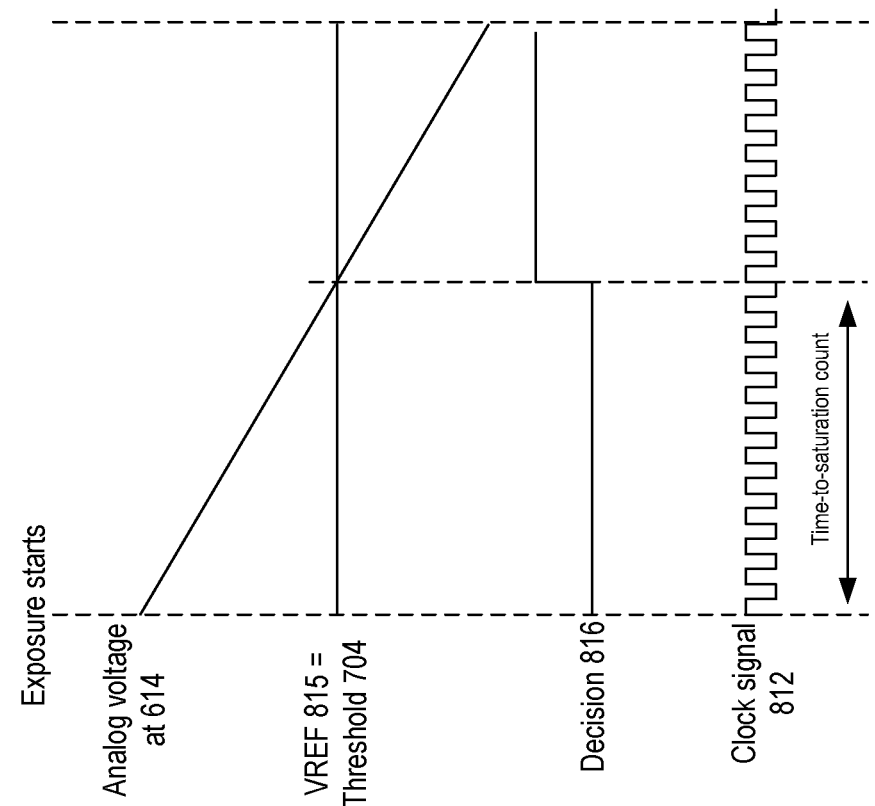

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold for saturation of charge storage unit 608 (e.g., threshold 704 of FIG. 7). Counter 808 can start counting right after the integration period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-to-saturation. The resolution of the time-to-saturation measurement can be defined based on, for example, the frequency at which counter 808 updates the count value. As to be discussed in more details below, a rate of charge accumulation at charge storage unit 608 can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 714 to generate a ramping VREF 815, which can either ramp up (in the example of FIG. 9B) or ramp down depending on implementation. The voltage range of ramping VREF 815 can be between threshold 704 (charge quantity threshold for saturation of charge storage unit 608) and threshold 702 (charge quantity threshold for saturation of photodiode 602), which can define the medium light intensity range. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips from negative to positive. The flipping of decision 816 may stop the counting of counter 808, and the count value can correspond to a total number of quantization steps accumulated to match, within one quantization step, the analog voltage. The count value corresponds to a measurement of time it takes for VREF 815 to reach the analog voltage and can be a digital representation of the quantity of charge stored at charge storage unit 608, as well as the digital representation of the incident light intensity. As discussed above, the quantization of the analog voltage can occur during the integration period (e.g., for medium light intensity range 708) and after the integration period (e.g., for low light intensity range 706).

As discussed above, ADC 610 can introduce quantization errors when there is a mismatch between a quantity of charge represented by the quantity level output by ADC 610 (e.g., represented by the total number of quantization steps) and the actual input quantity of charge that is mapped to the quantity level by ADC 610. The quantization error can be reduced by using a smaller quantization step size. In the example of FIG. 9B, the quantization step size can be reduced by the amount of increase (or decrease) in VREF 815 per clock cycle based on, for example, reducing input range 902 of the quantization operation (between thresholds 702 and 704), reducing the corresponding range of time to be measured by counter 808, increasing the clock frequency of clock signal 812, or any combination therefore.

Although quantization error can be reduced by using smaller quantization step sizes, area and performance speed may limit how far the quantization step can be reduced. For example, in a case where the clock frequency of clock signal 812 is increased while input range 902 remains the same, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
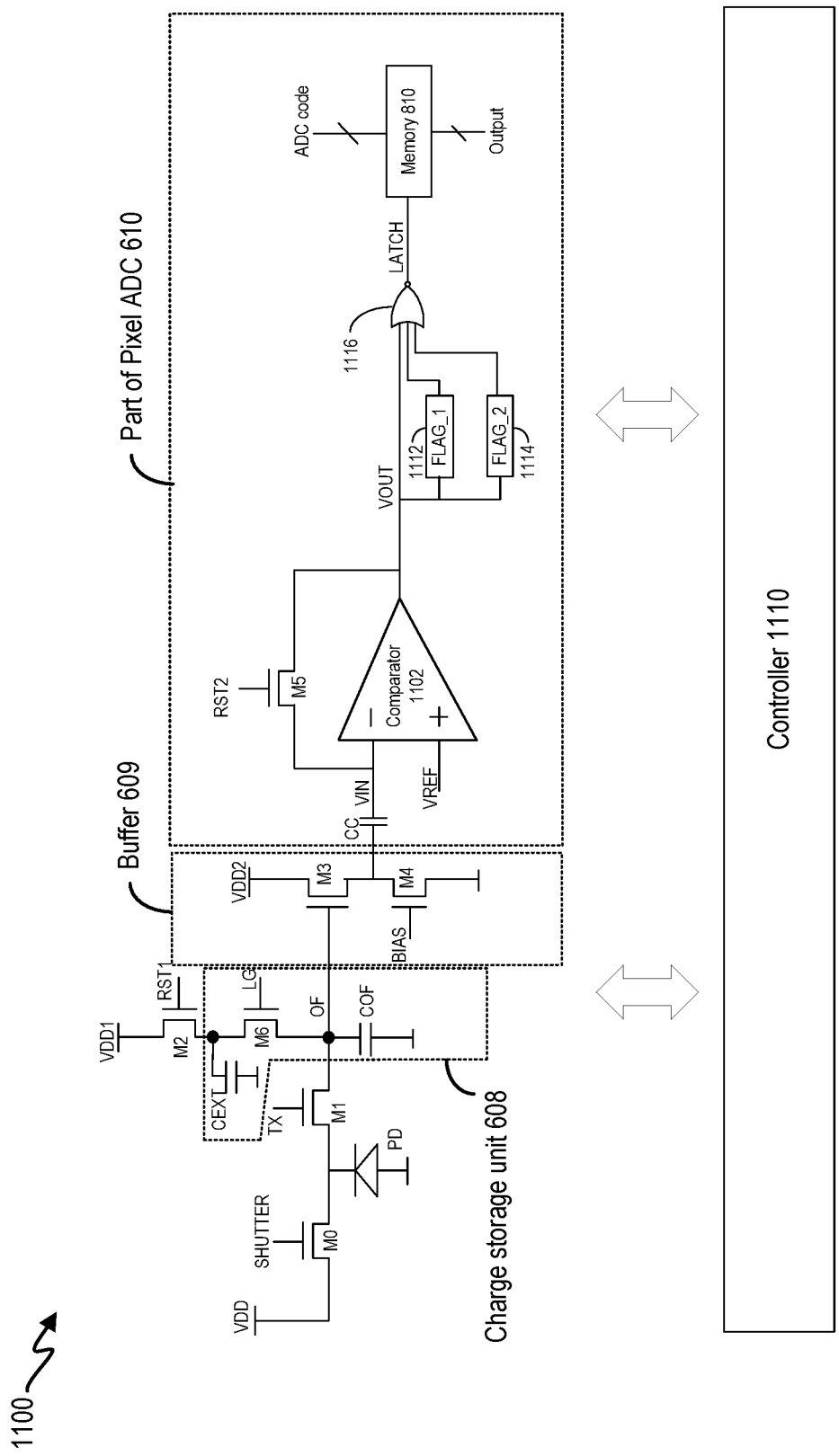
FIG. 11 illustrates block diagrams of an embodiment of a pixel cell.

Reference is now made to FIG. 11, which illustrates an example of pixel cell 1100, which can be an embodiment of pixel cell 600 of FIG. 6. In the example of FIG. 11, PD can correspond to photodiode 602, transistor M0 can correspond to shutter switch 604, transistor M1 can correspond to transfer gate 606, whereas transistor M2 can correspond to reset switch 607. Moreover, a combination of COF and CEXT capacitors can correspond to charge storage unit 608. COF capacitor can be the parasitic capacitor of a floating drain node. The capacitance of charge storage unit 608 is configurable by the signal LG. When LG is enabled, charge storage unit 608 provides combined capacities of COF and CEXT capacitors. When LG is disabled, CEXT capacitor can be disconnected from the parallel combination, and charge storage unit 608 comprises only a COF capacitor (plus other parasitic capacitances). As discussed above, the capacitance of charge storage unit 608 can be reduced to increase the charge-to-voltage conversion ratio for the low light intensity determination, and can be increased to provide the requisite capacity for the medium light intensity determination.

Pixel cell 1100 further includes an example of buffer 609 and an example of pixel ADC 610. For example, transistors M3 and M4 form a source follower which can be buffer 609 of FIG. 6 to buffer an analog voltage developed at the OF node, which represents a quantity of charge stored at the COF capacitor (or at the COF and CEXT capacitors). Further, the CC capacitor, comparator 1102, transistor M5, NOR gate 1116, together with memory 810, can be part of pixel ADC 610 to generate a digital output representing the analog voltage at the OF node. As described above, the quantization can be based on a comparison result (VOUT), generated by comparator 1102, between the analog voltage developed at the OF node and VREF. Here, the CC capacitor is configured to generate a VIN voltage (at one input of comparator 1102) which tracks the output of buffer 609, and provides the VIN voltage to comparator 1102 to compare against VREF. VREF can be a static voltage for time-of-saturation measurement (for high light intensity range) or a ramping voltage for quantization of an analog voltage (for low and medium light intensity ranges). The ADC code can be generated by a free-running counter (e.g., counter 808), and the comparison result generated by comparator 1102 can determine the ADC code to be stored in memory 810 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 includes techniques that can further improve the accuracy of the incident light intensity determination, in addition to the techniques disclosed above. For example, the combination of the CC capacitor and transistor M5 can be used to compensate for measurement errors (e.g., comparator offset) introduced by comparator 1102, as well as other error signals that are introduced to comparator 1102, such that the accuracy of comparator 1102 can be improved. The noise signals may include, for example, reset noise charge introduced by reset switch 607, a noise signal due to output of buffer 609 due to source follower threshold mismatches, etc. A quantity of charge reflecting the comparator offset as well as the error signals can be stored at the CC capacitor during a reset phase, when both transistors M2 and M5 are enabled. A voltage difference can also be developed across the CC capacitor during the reset phase due to the stored charge. During a measurement phase, the voltage difference across the CC capacitor remains, and the CC capacitor can track the output voltage of buffer 609 by subtracting away (or adding) the voltage difference to generate VIN. As a result, the VIN voltage can be compensated for the measurement errors and the error signals, which improves the accuracy of the comparison between VIN and VREF and the ensuing quantization.

In addition, pixel cell 1100 further includes a controller 1110. Controller 1110 can generate a sequence of control signals, such as SHUTTER, TX, RST1, RST2, etc., to operate pixel cell 1100 to perform a three-phase measurement operation corresponding to the three light intensity ranges of FIG. 7 (e.g., low light intensity range 706, medium light intensity range 708, and high light intensity range 710). In each phase, pixel cell 1100 can be operated in a measurement mode targeted for the corresponding light intensity range, and determine whether the incident light intensity falls within the corresponding light intensity range based on the decision output (VOUT) of comparator 1102. Pixel cell 1100 further includes a set of registers to store the decision outputs of some of the phases as FLAG_1 and FLAG_2 signals. Based on the FLAG_1 and FLAG_2 signals, controller 1110 can select the ADC code from one of the three phases to represent the incident light intensity. The selected ADC code can be stored in memory 810, and memory 810 can be locked based on a combination of the FLAG_1 and FLAG_2 signals by NOR gate 1116 to prevent subsequent measurement phases from overwriting the selected ADC code output in memory 810. At the end of the three-phase measurement process, controller 1110 can retrieve the ADC code stored in memory 810 and provide the ADC code as the digital output representing the incident light intensity.

Figure 12:
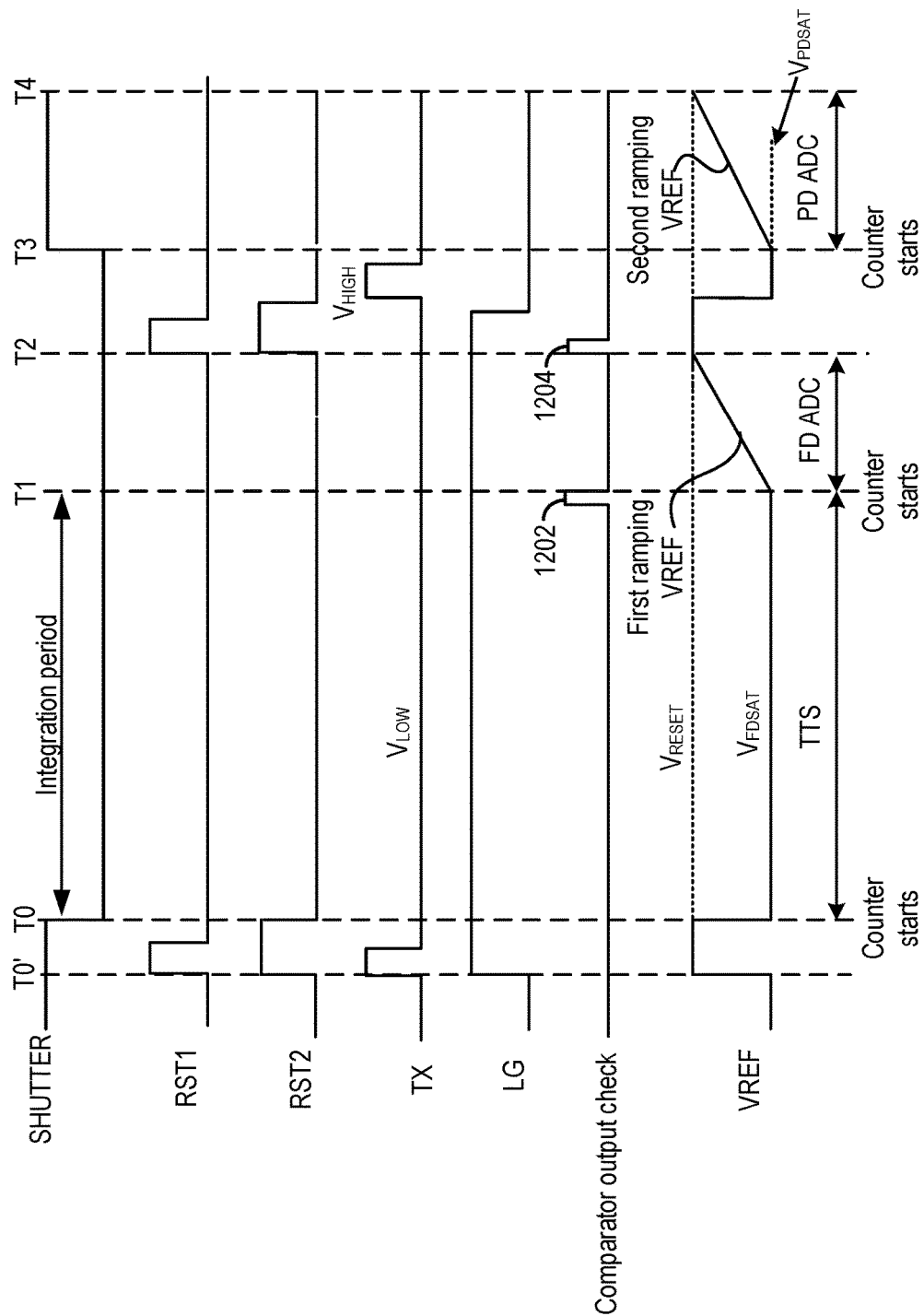
FIG. 12 illustrates an example sequence of control signals to perform light intensity measurement.

Reference is now made to FIG. 12, which illustrates a sequence of control signals of pixel cell 1100 for the three-phase measurement operation with respect to time. Referring to FIG. 12, the time between T0' and T0 corresponds to a first reset phase. The time period between T0 and T1 corresponds to an integration period and a time-to-saturation measurement mode. The time period between T1 and T2 corresponds to a measurement mode to measure a quantity of overflow charge stored in a floating drain. The measurement mode for measurement of overflow charge is labelled "FD ADC" in FIG. 12 and can be used to measure medium light intensity 708. In addition, the time period between T2 and T3 includes a second reset phase followed by transfer of charge stored in photodiode 602 to the floating drain. Moreover, the time period between T3 and T4 corresponds to a measurement mode to measure a quantity of charge stored in the photodiode and transferred to the floating drain. The measurement mode for measuring the charge stored in the photodiode is labelled "PD ADC" in FIG. 12 and can be used to measure low light intensity 712. Pixel cell 1100 can provide the digital output representing the incident light intensity at time T4, and then start the next three-phase measurement operation.

As shown in FIG. 12, before T0, the RST1 and RST2 signals, the LG signal, and the shutter signal, are asserted, whereas the TX signal is biased at a voltage $V_{LOW}$. $V_{LOW}$ can correspond to the charge capacity of the photodiode PD to allow only overflow charge (if any) to flow from the photodiode PD to the CEXT capacitor and the COF capacitor via transistor M1. With such arrangements, both photodiode PD, as well as the CEXT capacitor and the COF capacitor, can be reset. Moreover, no charge is added to the capacitors because the charge generated by photodiode PD is diverted away by transistor M0. The voltage across the photodiode PD, as well as the OF node, can be set to a voltage equal to $V_{RESET}$, which can represent a state where the photodiode PD, the CEXT capacitor, and the COF capacitor do not store any charge. Further, comparator 1102 is also in a reset phase, and the CC capacitor can store charge reflecting the reset noise introduced by M2, the comparator offset, the threshold mismatch of buffer 609, etc. In addition, the VREF can also be set to a value equal to $V_{RESET}$. In some examples, $V_{RESET}$ can be equal to a supply voltage (e.g., VDD) to pixel cell 1100. Moreover, counter 808 can be in a reset state.

At time T0, counter 808 can start counting from an initial value (e.g., zero). During the time period between T0 and T1, the shutter signal is de-asserted, while the LG signal remains asserted and the TX signal remains at $V_{LOW}$. The time period between T0 and T1 can be an integration period. VREF can be set to a value equal to $V_{FDSAT}$, which can correspond to a voltage of the OF node when both CEXT and COF capacitors are at capacity. The difference between $V_{FDSAT}$ and $V_{RESET}$ can correspond to, for example, threshold 704 of FIG. 7. During the time period between T0 and T1, a time-to-saturation (TTS) measurement can be performed, in which overflow charge flows from the photodiode PD to the COF capacitor and the CEXT capacitor via transistor M1 to develop a ramping voltage at OF node. A buffered and error-compensated version of analog voltage at the OF node (VIN) can be compared against $V_{FDSAT}$ while counter 808 is free-running. If the total charge stored at the COF capacitor and the CEXT capacitor exceeds threshold 704 (based on the OF node voltage), the output of comparator 1102 can flip, which indicates that incident light is in the high intensity range and the TTS measurement result can be used to represent the intensity of incident light. Therefore, the count value generated by counter 808 at the time of flipping can be stored into memory 810. A checking 1202 of the output of comparator 1102 can be made at time T1, and the flipping of comparator 1102 also causes controller 1110 to assert the FLAG_1 signal in register 1112. The non-zero FLAG_1 signal value can cause the output of NOR gate 1116 to remain low regardless of other inputs to the NOR gate, and can lock the memory and prevent subsequent measurement phases from overwriting the count value. On the other hand, if comparator 1102 never flips during the time period between T0 and T1, which indicates that the incident light intensity is below the high light intensity range, the FLAG_1 signal stays zero. Controller 1110 does not update the FLAG_2 value stored in register 1114 between time period T0-T1, and the FLAG_2 value can remain zero.

At time T1, counter 808 can restart counting from its initial value (e.g., zero). During the time period between T1 and T2, the FD ADC operation can be performed, in which the analog voltage at the OF node can be quantized by ADC 610 to measure the quantity of overflow charge stored in the CEXT capacitor and the COF capacitor. In some examples, during the time period T1-T2, photodiode PD can be shielded from incident light (e.g., by mechanical shutter 404), so that the total overflow charge stored in the CEXT capacitor and the COF capacitor, and the analog voltage at the OF node, remain constant. A first ramping threshold voltage (labelled "first ramping VREF" in FIG. 12) can be supplied to comparator 1102 to be compared against the buffered and error-compensated version of analog voltage at the OF node (VIN). In some examples, the first ramping VREF can be generated by a DAC based on count values from the free running counter. If the ramping VREF matches the VIN (within one quantization step), the output of comparator 1102 can flip, and the count value generated by counter 808 at the time of flipping can be stored into memory 810, if the memory is not locked by the first phase of measurement (as indicated by the zero value of FLAG_1 signal). If the memory is locked, the count value will not be stored into memory 810.

In some examples, as shown in FIG. 12, the voltage range of the first ramping VREF can be between $V_{FDSAT}$ and $V_{RESET}$. $V_{FDSAT}$ can define the upper limit of the total overflow charge stored in the CEXT capacitor and the COF capacitor (when they are close to saturated), whereas $V_{RESET}$ can define the lower limit of the total overflow charge stored in the capacitors (when there is no overflow charge, hence the voltage of the OF node remains at $V_{RESET}$). The flipping of comparator 1102 in the FD ADC phase can indicate that the OF node voltage is lower than $V_{RESET}$, which may mean that the total overflow charge stored in the capacitors exceed the lower limit. Therefore, the flipping of comparator 1102 in the FD ADC phase can indicate that the photodiode PD saturates, hence there is overflow charge stored in the capacitors, and the quantization result of the overflow charge can represent the intensity of incident light. A checking 1204 of the output of comparator 1102 can be made at time T2 after the FD ADC phase, and controller 1110 can assert the FLAG_2 signal in register 1114 based on the flipping of comparator 1102 to lock the count value stored in memory 810, which prevents the subsequent phase from storing another count value in memory 810.

At the beginning of the time period between T2 and T3, both RST1 and RST2 signals can be asserted again for a second reset phase. The purpose of the second reset phase is to reset the CEXT and COF capacitors, and to prepare the COF capacitor for storing charge transferred from the PDCAP capacitor in the third phase of measurement (for low light intensity range). The LG signal can also be de-asserted to disconnect the CEXT capacitor from the COF capacitor and to reduce the capacitance of the measurement capacitor. The reduction of the capacitance is to increase the charge-to-voltage conversion ratio to improve the low light intensity determination, as discussed above. Comparator 1102 is also put into the reset state where the CC capacitor can be used to store the noise charge generated by the resetting of the CEXT and COF capacitors. Towards time T3, after the resetting completes, the RST1 and RST2 signals are de-asserted, whereas the bias TX can increase to $V_{HIGH}$ to fully turn on transistor M1. The charge stored in the photodiode PD can then move into the COF capacitor via M1.

At time T3, counter 808 can restart counting from its initial value (e.g., zero). During the time period between T3 and T4, PD ADC operation can be performed for the low light intensity range. During that period, the shutter signal is asserted, whereas the TX signal is de-asserted (e.g., setting to zero) or set back to $V_{LOW}$ to prevent charge stored at the COF capacitor from leaking via M1. A second ramping threshold voltage (labelled "second ramping VREF" in FIG. 12) can be supplied to comparator 1102 to be compared against the buffered and error-compensated version of analog voltage at the OF node (VIN). The second ramping VREF can have a voltage range between $V_{PDSAT}$, which represents the voltage at COF capacitor when it stores a quantity of residual charge that saturates the photodiode PD, and $V_{RESET}$. If the second ramping VREF matches the VIN (within one quantization step), the output of comparator 1102 may flip, and the count value generated by counter 808 at the time of flipping can be stored into memory 810, if the memory is not locked by the first phase of measurement (as indicated by the zero value of FLAG_1 signal) or by the second phase of measurement (as indicated by the zero value of FLAG_2 signal).

Although FIG. 12 shows a three-phase measurement operation to measure incident light intensity, it is understood that one or more of the phases be skipped based on, for example, an expected incident light intensity range for an operation environment. For example, if the pixel cell operates in an environment with low ambient light (e.g., in the night time), the first phase of measurement, which is targeted at high light intensity, can be skipped. Moreover, if the pixel cell operates in an environment with medium or strong ambient light (e.g., in the day time), the third phase of measurement, which is targeted at low light intensity, can be skipped.

Figure 13A:
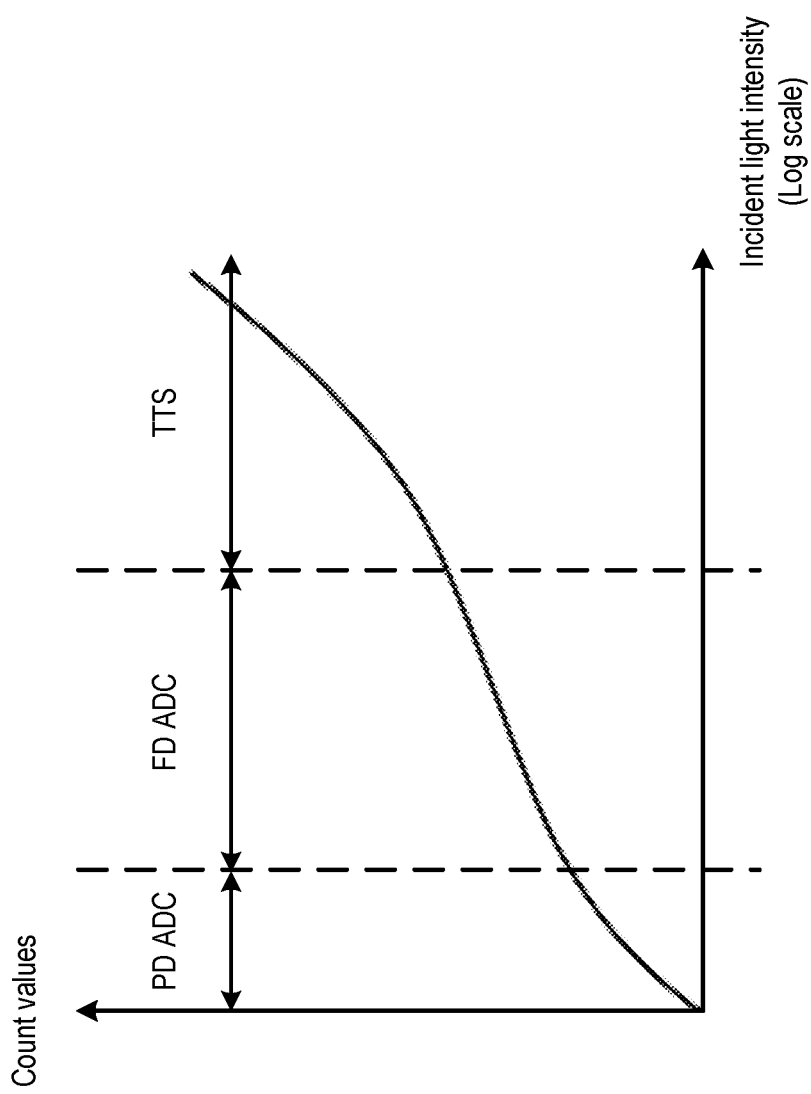
FIG. 13A, FIG. 13B, and FIG. 13C illustrate examples of relationships between outputs of an image sensor and incident light intensity.

FIG. 13A illustrates an example of relationships between the count values output by pixel cell 1100 and incident light intensity. In FIG. 13A, the x-axis represents a range of incident light intensities including the intensity ranges for the TTS, FD ADC and PD ADC operations on a logarithmic scale, whereas the y-axis represents the count values output for the range of incident light intensities on a linear scale. As shown in FIG. 13A, the count values can have different relationships with respect to the incident light intensities for different intensity ranges. For example, in PD ADC the count values change with respect to the incident light intensity at a higher rate than in FD ADC. This can be due to the charge storage capacity of charge storage unit 608 being reduced in PD ADC to increase the charge-to-voltage conversion gain. As a result, a given range of PD ADC count values can cover a smaller intensity range than the same range of FD ADC count values, and the quantization resolution for PD ADC can be improved. Moreover, in TTS the count values change with respect to the incident light intensity at an even higher rate than in FD ADC (and in PD ADC). This can be due to the fact that TTS measures time to saturation rather than a quantity of charge as in FD ADC and in PD ADC operations.

Figure 13B:
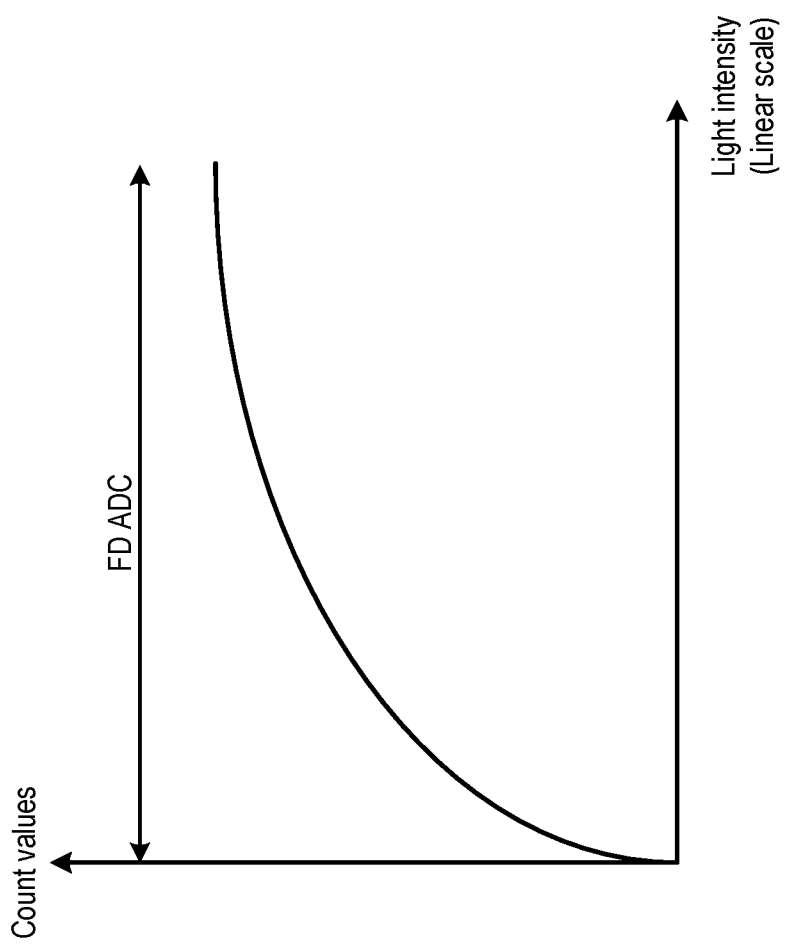

FIG. 13B illustrates another example of relationships between the count values output by pixel cell 1100 and incident light intensity where a non-uniform quantization scheme of FIG. 10A and FIG. 10B is used. In FIG. 13B, the x-axis represents a range of incident light intensities including, for example, the intensity range for the FD ADC operation on a linear scale, whereas the y-axis represents the count values output for the range of incident light intensities on a linear scale. As shown in FIG. 13B, the count values are not linearly related to the incident light intensity due to the non-uniform quantization scheme. Towards the lower end of the intensity range, the rate of change of the count values with respect to the incident light intensity can be higher due to a smaller quantization step. Moreover, towards the higher end of the intensity range, the rate of change of the count values with respect to the incident light intensity can be lower due to a larger quantization step.

Figure 13C:
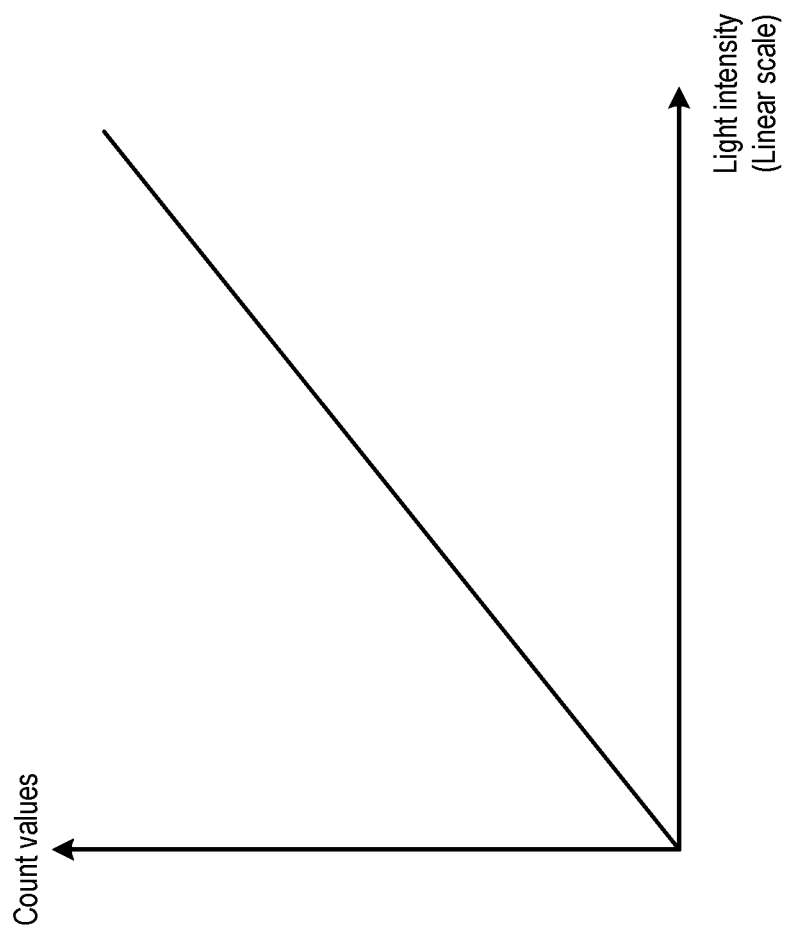

The varying relationships between count values and light intensities can pose problems for an application that uses the count values to determine the incident light intensities. The application typically only receives the count values and has no other information of the operation of the image sensor, such as which mode(s) of operation generate the count values, the quantization resolutions, etc. The application may operate on the count values based on an expectation that the count values have an uniform relationship with respect to the light intensity across the entire dynamic range. Moreover, some applications that rely on image feature extraction, such as SLAM, may require the count values to have an uniform relationship with respect to light intensity, such as one as shown in FIG. 13C, to determine differences between count values of neighboring pixels, and to extract image features based on the differences. Such applications may not be able to work properly with the count values output from the aforementioned multi-mode measurement operations without additional post-processing.

Figure 14:
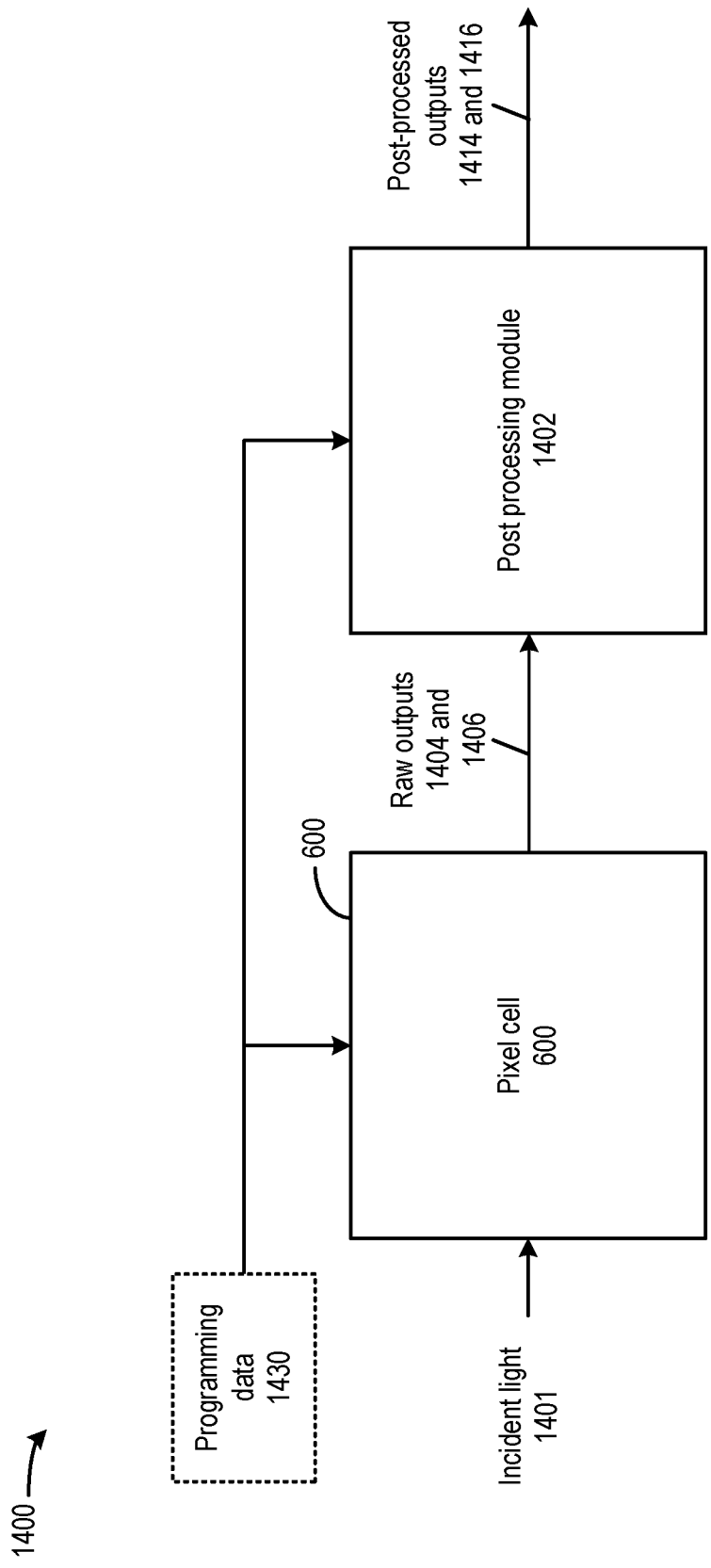
FIG. 14 illustrates an example system to perform post processing of image sensor outputs.

FIG. 14 illustrates an example system 1400 that can provide image sensor output that has an uniform relationship with respect to incident light intensity. As shown in FIG. 14, system 1400 includes pixel cell 600 and a post processing module 1402. Pixel cell 600 can receive incident light 1401 and generate raw outputs 1404 and 1406 (e.g., count values) to represent different intensities of incident light 1401. Raw outputs 1404 and 1406 may have different relationships with respect to the light intensities represented by the raw outputs. For example, raw output 1404 can be generated from a TTS operation, whereas raw output 1406 can be generated from a FD ADC or PD ADC operation.

Post processing module 1402 can perform post-processing operations on raw outputs 1404 and 1406 to generate, respectively, post-processed outputs 1404 and 1406 which have the same relationship with respect to the light intensities represented by the post-processed outputs, such as the relationship shown in FIG. 13C. In some examples, post processing module 1402 can include a hardware processor (e.g., general purpose central processing unit, digital signal processor, etc.) to execute software instructions to perform the post-processing operations. In some examples, post processing module 1402 can include an application specific integrated circuit (ASIC), a Field Programmable Gate Array (FPGA), etc., which can include logic circuits to perform the post-processing.

In addition, as shown in FIG. 14, both pixel cell 600 and post processing module 1402 can receive programming data 1430. Programming data 1430 can configure various aspects of generation of raw outputs at pixel cell 600, such as analog-to-digital conversion gain (ADC gain), integration period, etc. The ADC gain can define a relationship between the count value and the OF voltage (which represents a quantity of charge stored in charge storage unit 608), whereas the integration period can define a relationship between the quantity of charge generated by the photodiode and stored in the charge storage unit and the light intensity. Based on programming data 1430, post processing module 1402 can also determine the relationship between the raw output and the light intensity to perform the post-processing operation.

Referring back to FIG. 13C, a uniform relationship may exist between incident light intensity and a quantity of charge generated by the photodiode PD in response to the incident light within the integration period. Therefore, to determine post-processed outputs from the raw outputs, post processing module 1402 can estimate a quantity of charge generated by the photodiode PD within the integration period for FD ADC and PD ADC operations. For TTS operation, given that the raw output measures a time-to-saturation and the charge storage unit 608 may stop accumulating charge before the integration period ends, post processing module 1402 can also estimate a quantity of charge that would have been generated by the photodiode PD within the integration period. Post processing module 1402 can then determine the post-processed outputs based on the quantity of charge. Post processing module 1402 can also adjust the quantity of charge to add in or substrate other noise charge, such as dark charge generated by dark current at the photodiode PD and at the floating drain node, to further improve the uniformity of the relationship between the post-processed outputs and the light intensities.

Figure 15A:
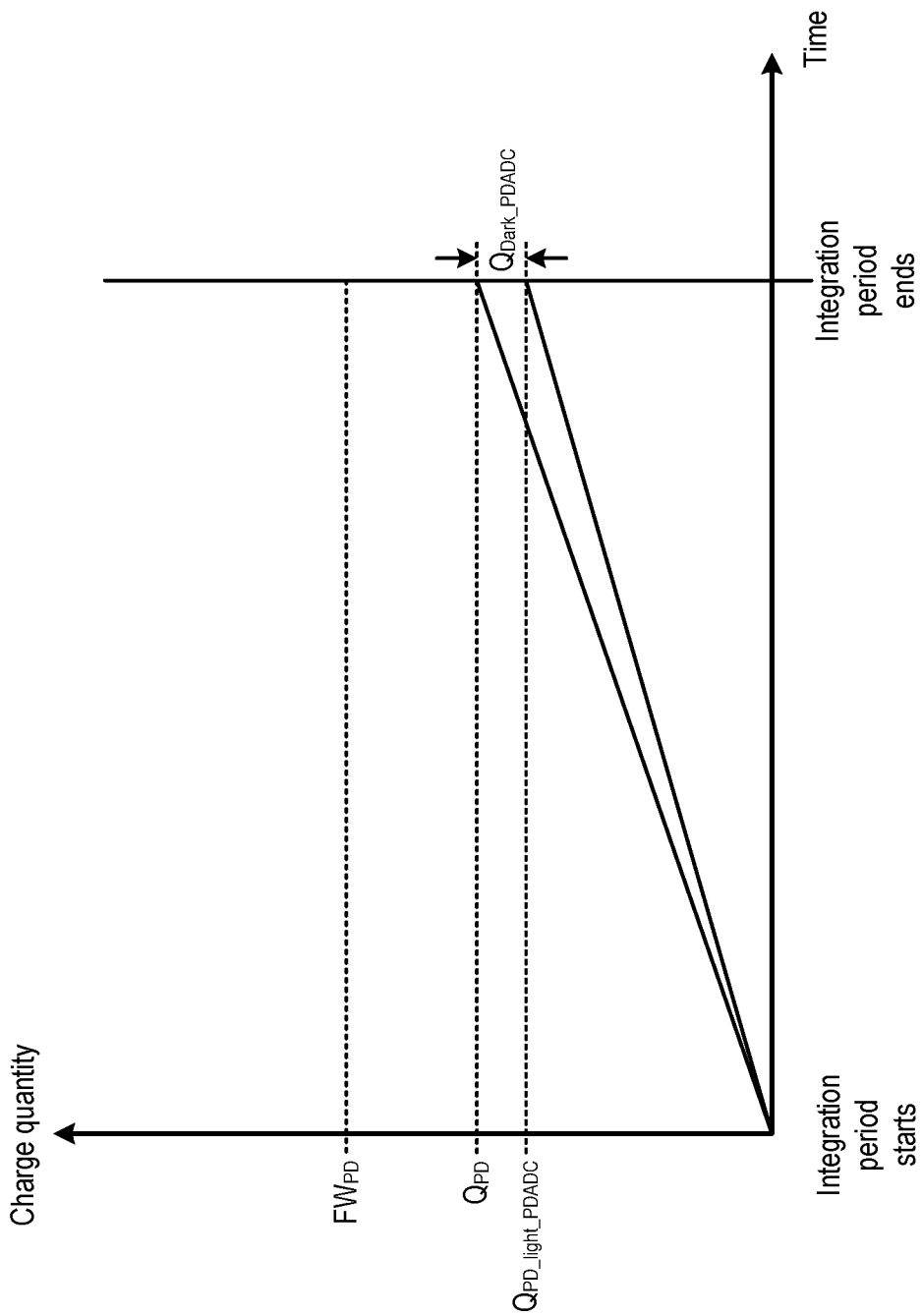
FIG. 15A, FIG. 15B, and FIG. 15C illustrate examples of relationships between a quantity of charge accumulated and time for various measurement modes.
Figure 15B:
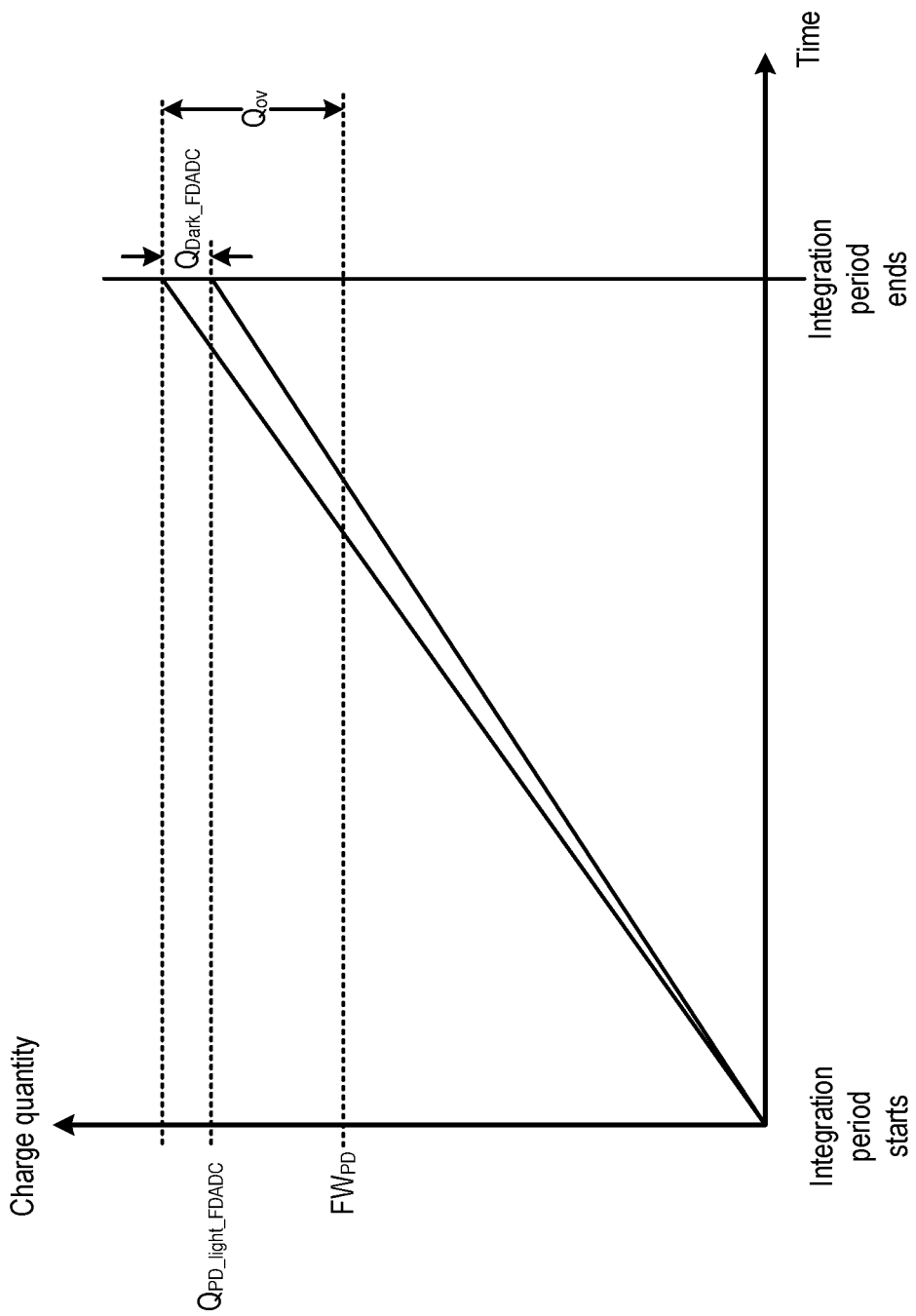
Figure 15C:
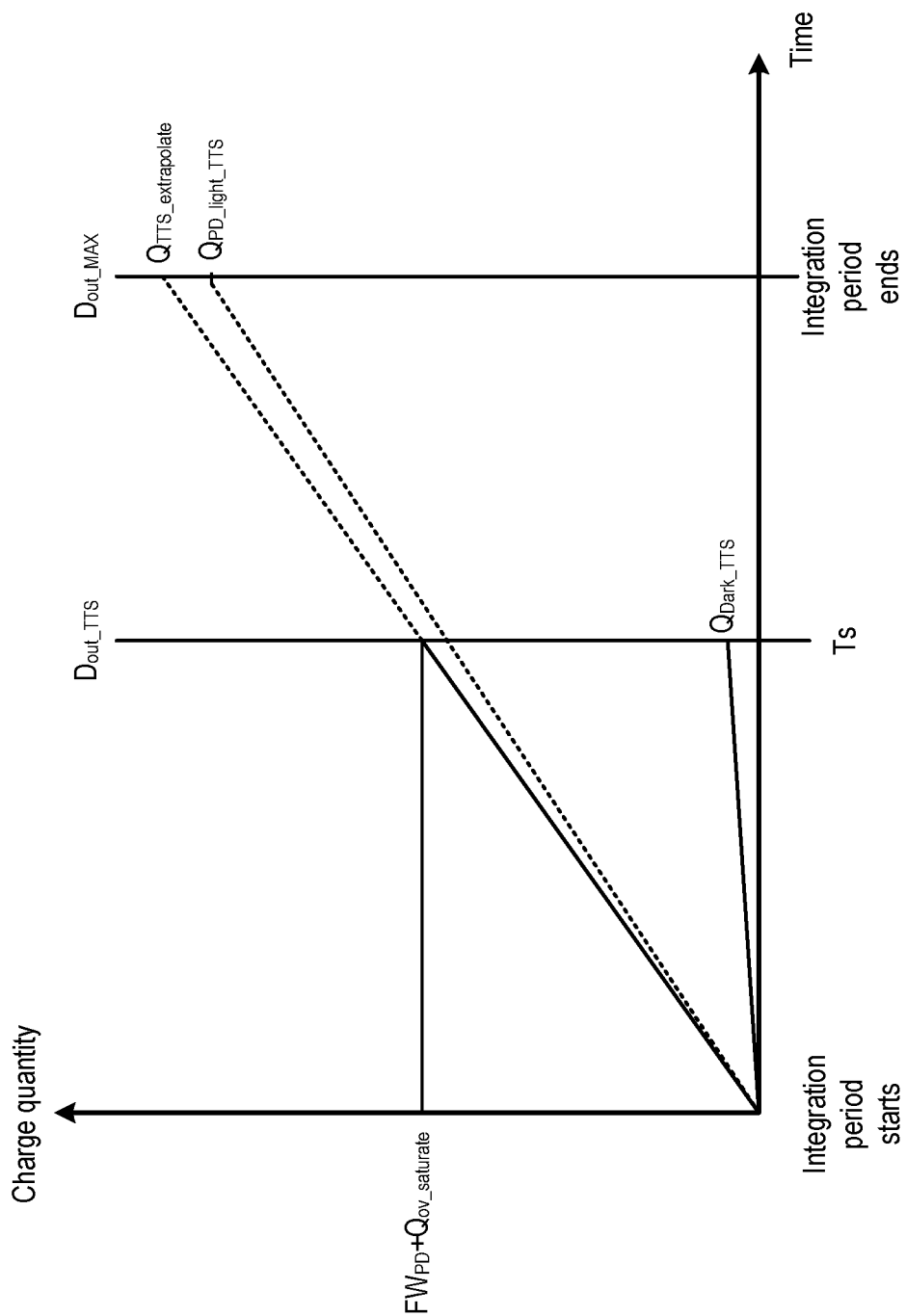

FIG. 15A, FIG. 15B, and FIG. 15C illustrate example relationships between charge and time in different measurement operations which can serve as the basis for the post-processing operations at post processing module 1402. FIG. 15A illustrates an example relationship for the PD ADC measurement operation. As shown in FIG. 15A, within the integration period, the photodiode PD can accumulate a quantity of residual charge $Q_{PD}$ before it saturates, when the quantity of accumulated residual charge equals to the photodiode full well capacity $FW_{PD}$. Part of $Q_{PD}$ is $Q_{PD\_light\_PDADC}$ which is generated by the photodiode PD in response to incident light and is linearly related to the intensity of the incident light. The remaining is dark charge $Q_{Dark\_PDADC}$ from the integration of a dark current $DC_{PD}$ at the photodiode PD within the integration period $T_{int}$ as follows:

$$Q_{PD\_light\_PDADC} = Q_{PD} - Q_{Dark\_PDADC} = Q_{PD} - DC_{PD} \times T_{int} \quad \text{(Equation 1)}$$

As described above, during the PD ADC operation the residual charge $Q_{PD}$ is transferred to charge storage unit 608 to develop a voltage, which can be quantized by a quantizer (e.g., comparator 1102, counter 808, and memory 810) into a count value $D_{out\_PD}$. The voltage difference between $V_{RESET}$ and the voltage represented by $D_{out\_PD}$ can represent a quantized representation (with ADC gain G) of $Q_{PD}$. Equation 1 can be rewritten as follows:

$$Q_{PD\_light\_PDADC} = \frac{(V_{RESET\_Q} - D_{out\_PD}) \times C_{HG}}{G} - DC_{PD} \times T_{int} \quad \text{(Equation 2)}$$

In Equation 2 above, $V_{RESET\_Q}$ represents the quantized version of the analog reset voltage $V_{RESET}$. $C_{HG}$ represents a conversion factor at high gain mode to convert charge to a quantized value, with an unit e-/LSB, and is based on the capacitance of charge storage unit 608 at high gain mode for PD ADC measurement. The post-processed output of $D_{out\_PD}$, $D_{out\_PD\_post}$, can represent a result of quantizing a voltage developed with storing $Q_{PD\_light\_PDADC}$ in charge storage unit 608 at high gain mode with a quantizer of ADC gain G, as follows:

$$D_{out\_PD\_post} = \frac{Q_{PD\_light\_PDADC}}{C_{HG}} \times G = \quad \text{(Equation 3)}$$
$$V_{RESET\_Q} - D_{out\_PD} - \frac{(DC_{PD} \times T_{int}) \times G}{C_{HG}}$$

Based on an indication that a count value from pixel cell 600 is from PD ADC operation (e.g., based on the count value being within a range of count values associated with PD ADC, or based on other signals from pixel cell 600), post processor 1402 can use Equation 3 to compute the post-processed output $D_{out\_PD\_post}$ from raw output $D_{out\_PD}$. Post processor 1402 can also obtain ADC gain G, integration period $T_{int}$, quantized reset voltage $V_{RESET\_Q}$, dark current, full well capacity of the photodiode, etc. from programming data 1430.

FIG. 15B illustrates an example relationship between charge and time for the FD ADC measurement operation. As shown in FIG. 15B, within the integration period, the photodiode PD can accumulate a quantity of residual charge equals to the photodiode full well capacity $FW_{PD}$ (in the unit of e-) when it saturates. Beyond the point of saturation, overflow charge $Q_{ov}$ can accumulate at charge storage unit 608 until the integration period ends. The total charge generated by the photodiode PD in response to light within the integration period, $Q_{PD\_light\_FDADC}$, can be a sum of $FW_{PD}$ and $Q_{ov}$ but offset by dark charge $Q_{Dark\_FDADC}$ from the integration of a dark current $DC_{PD}$ at the photodiode PD and the integration of a dark current $DC_{FD}$ at the floating drain node within the integration period $T_{int}$, as follows:

$$Q_{PD\_light\_FDADC} = Q_{ov} + FW_{PD} - Q_{Dark\_FDADC} \quad \text{(Equation 4)}$$
$$= Q_{ov} + FW_{PD} - (DC_{PD} + DC_{FD}) \times T_{int}$$

As described above, during the FD ADC operation the overflow charge $Q_{FD}$ is accumulated at charge storage unit 608 to develop a voltage, which can be quantized by a quantizer (e.g., comparator 1102, counter 808, and memory 810) into a count value $D_{out\_FD}$. The voltage difference between $V_{RESET}$ and the voltage represented by $D_{out\_FD}$ can represent a quantized representation (with ADC gain G) of $Q_{FD}$. Equation 4 can be rewritten as follows:

$$Q_{PD\_light\_FDADC} = \frac{(V_{RESET\_Q} - D_{out\_PD}) \times C_{LG}}{G} + \quad \text{(Equation 5)}$$
$$FW_{PD} - (DC_{PD} + DC_{FD}) \times T_{int}$$

In Equation 5 above, $C_{LG}$ represents a conversion factor at low gain mode, with a unit e-/LSB, and is based on the capacitance of charge storage unit 608 at low gain mode, where the capacitance of charge storage unit 608 increases with respect to PD ADC. The post-processed output of $D_{out\_FD}$, $D_{out\_FD\_post}$, can represent a result of quantizing a voltage developed with storing $Q_{PD\_light\_FDADC}$ in $C_{HG}$ (to have the same scale as PD ADC) with a quantizer of ADC gain G, as follows:

$$D_{out\_FD\_post} = \frac{Q_{PD\_light\_FDADC}}{C_{HG}} \times G \quad \text{(Equation 6)}$$
$$= \left( \frac{(V_{RESET\_Q} - D_{out\_FD}) \times C_{LG}}{G} + FW_{PD} - (DC_{PD} + DC_{FD}) \times T_{int} \right) \times \frac{G}{C_{HG}}$$
$$= \frac{(V_{RESET\_Q} - D_{out\_PD}) \times C_{LG}}{C_{HG}} + \frac{FW_{PD} \times G}{C_{HG}} - \frac{(DC_{PD} + DC_{FD}) \times T_{int} \times G}{C_{HG}}$$

Based on an indication that a count value from pixel cell 600 is from FD ADC operation (e.g., based on the count value being within a range of count values associated with FD ADC, or based on other signals from pixel cell 600), post processor 1402 can use Equation 6 to compute the post-processed output $D_{out\_FD\_post}$ from raw output $D_{out\_FD}$. Post processor 1402 can also obtain ADC gain G, integration period $T_{int}$, quantized reset voltage $V_{RESET\_Q}$, dark current, full well capacity of the photodiode, etc. from programming data 1430.

FIG. 15C illustrates an example relationship between charge and time for the TTS measurement operation. As shown in FIG. 15C, before the integration period ends, the overflow charge may saturate at time Ts (with respect to start of integration period). The total quantity of charge generated by the photodiode from when integration period starts to time Ts equals a sum of $FW_{PD}$ (full well capacity of photodiode PD) and $Q_{ov\_saturate}$, a quantity of overflow charge that saturates charge storage device 608 in the low gain mode, which can be given by $(V_{RESET}-V_{FDSAT}) \times C_{LG}$. The time Ts can be measured and quantized by counter 808 to generate a count value $D_{out\_TTS}$. The end of integration period can be represented by a count value $D_{out\_MAX}$. To create the same uniform relationship between charge and light intensity as in Equation 3 (for PD ADC) and in Equation 6 (for FD ADC), post processing module 1402 can extrapolate a quantity of charge that would have been stored at charge storage device 608 at high gain mode within the integration period for the TTS operation, $Q_{TTS\_extrapolate}$, based on the following equation:

$$D_{TTS\_extrapolate} = \frac{D_{out\_max}}{D_{out\_TTS}} \times (FW_{PD} + (V_{RESET} - V_{FDSAT}) \times C_{LG}) \quad \text{(Equation 7)}$$

In addition, between when the integration period starts and Ts, the photodiode PD and the floating drain node can accumulate a quantity of dark charge $Q_{Dark\_TTS}$ as follows:

$$D_{Dark\_TTS} = (DC_{PD} + DC_{FD}) \times T_{int} \times \frac{D_{out\_TTS}}{D_{out\_max}} \quad \text{(Equation 8)}$$

The extrapolated charge $Q_{TTS-extrapolate}$ can be offset by $Q_{Dark-TTS}$ to obtain the $Q_{PD-TTS}$, which corresponds to the part of the charge generated by the photodiode in response to incident as light, as follows:

$$Q_{PD\_light\_TTS} = Q_{TTS\_extrapolate} - Q_{Dark-TTS} \quad \text{(Equation 9)}$$

Equation 9 can be rewritten in terms of $D_{out\_TTS}$ as follows:

$$Q_{PD\_light\_TTS} = \quad \text{(Equation 10)}$$
$$\frac{D_{out\_max}}{D_{out\_TTS}} \times (FW_{PD} + (V_{RESET} - V_{FDSAT}) \times C_{LG}) -$$
$$(DC_{PD} + DC_{FD}) \times T_{int} \times \frac{D_{out\_TTS}}{D_{out\_max}}$$

The post-processed output of $D_{out\_TTS}$, $D_{out\_TTS\_post}$, can represent a result of quantizing a voltage developed with storing $Q_{PD-light}$ in $C_{HG}$ (to have the same scale as PD ADC and FD ADC) with a quantizer of ADC gain G, as follows:

$$D_{out\_TTS\_post} = \frac{Q_{PD\_light\_TTS}}{C_{HG}} \times G \quad \text{(Equation 11)}$$

Equation 11 can be combined with Equation 10 as follows:

$$D_{out\_TTS\_post} = \quad \text{(Equation 12)}$$
$$\left( \frac{D_{out\_max}}{D_{out\_TTS}} \times (FW_{PD} + (V_{RESET} - V_{FDSAT}) \times C_{LG}) - (DC_{PD} + DC_{FD}) \times T_{int} \times \frac{D_{out\_TTS}}{D_{out\_max}} \right) \times \frac{G}{C_{HG}}$$

Based on an indication that a count value from pixel cell 600 is from TTS operation (e.g., based on the count value being within a range of count values associated with TTS, or based on other signals from pixel cell 600), post processor 1402 can use Equation 12 to compute the post-processed output $D_{out\_TTS\_post}$ from raw output $D_{out\_TTS}$. Post processor 1402 can also obtain ADC gain G, integration period $T_{int}$, charge storage capacity (in terms of charge) of charge storage unit 608 in low gain mode, dark current, full well capacity of the photodiode, etc. from programming data 1430.

The parameters in the above equations, such as full well capacity of photodiode PD, dark currents, ADC gain, conversion gain, etc., can be measured in a calibration process. Some of these parameters can also be measured for different environment conditions, such as temperature (which can affect the dark current). A set of parameters corresponding to a particular temperature can then be provided to post processing module 1402 to perform post-processing operations of count values obtained at that particular temperature, to further improve the uniformity of the relationship between the post-processed outputs and different light intensities.

Figure 16A:
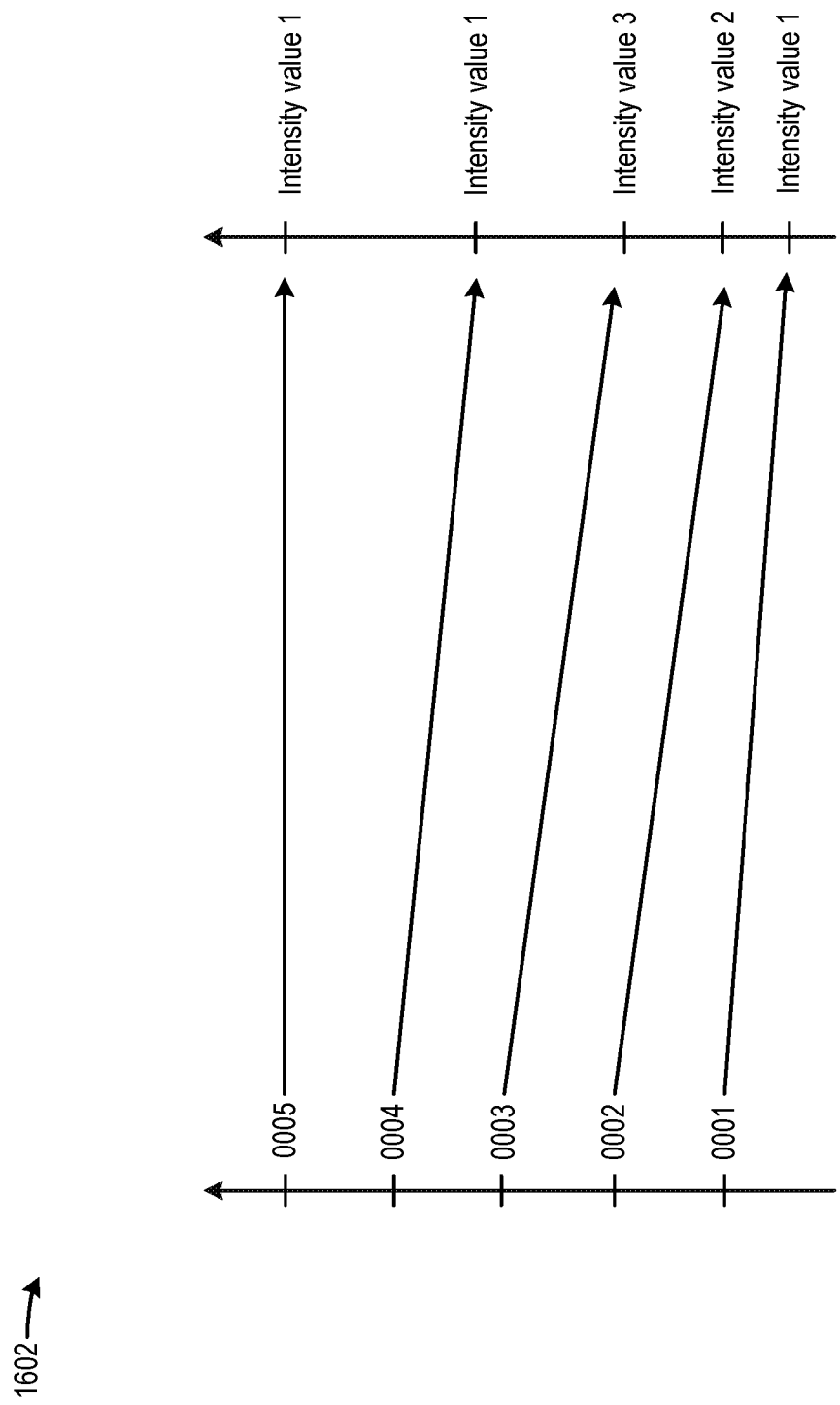
FIG. 16A and FIG. 16B illustrate examples of a system for post-processing image sensor output.
Figure 16B:
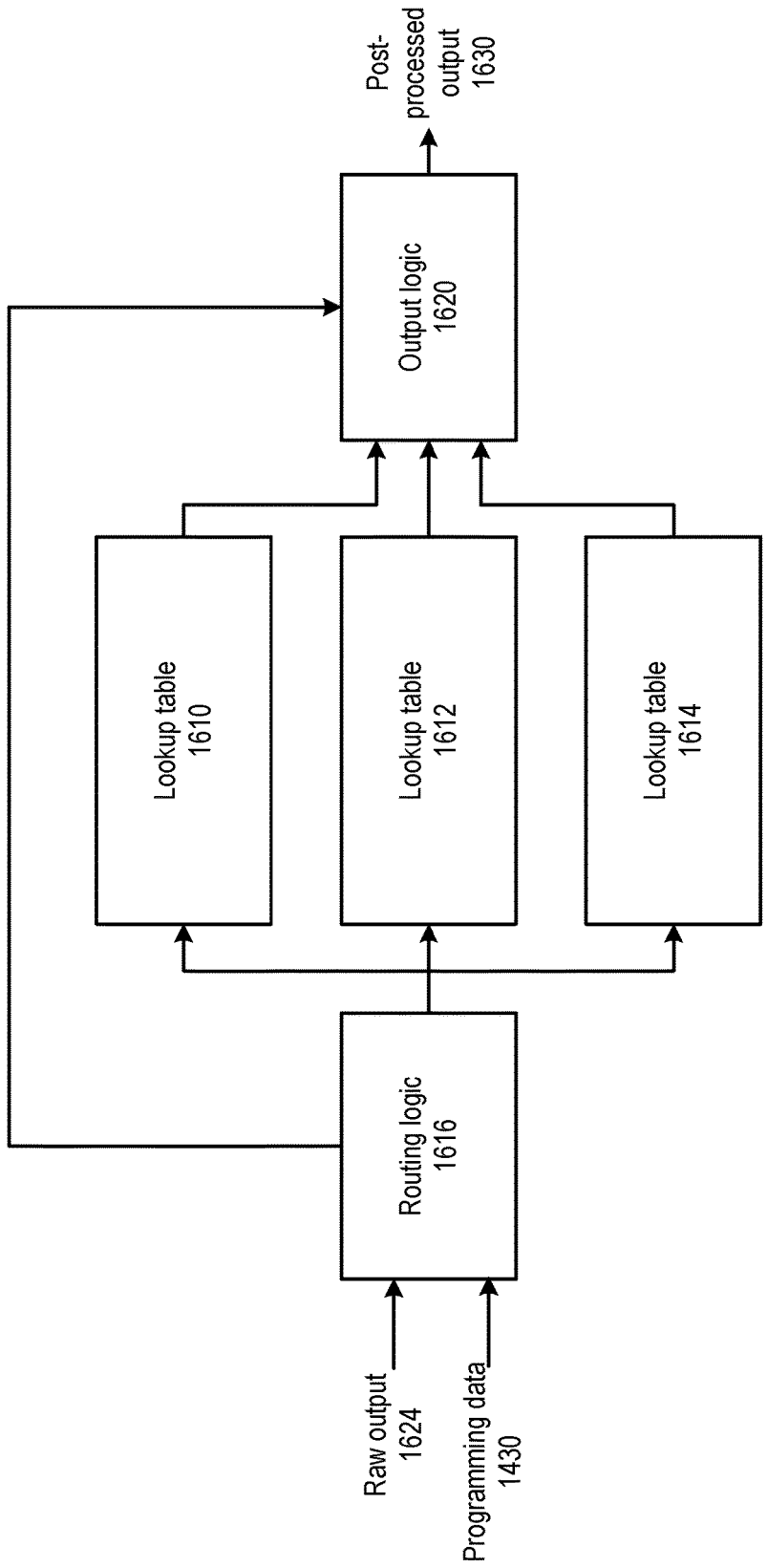

In some scenarios, close-formed equations such as Equations 3, 6, and 12 for mapping a raw output to a post-processed output do not exist. One example scenario is when non-uniform quantization is used. In such cases, one or more lookup tables can be implemented in post processing module 1402 to perform the post processing operations. FIG. 16A and FIG. 16B illustrates examples of lookup tables that can be part of post processing module 1402. As shown in FIG. 16A, a lookup table 1602 can map a set of count values (e.g., 0000, 0001, 0002, etc.) to a set of intensity values to be provided as post-processed outputs The count values can be generated from a non-uniform quantization scheme such that lower values represent finer quantization steps while higher values represent more coarse quantization steps, which are reflected by the separation between the corresponding intensity values.

In some examples, as shown in FIG. 16B, post processing module 1402 may include multiple lookup tables, such as lookup tables 1610, 1612, and 1614. Each lookup table can be for a particular measurement mode (e.g., TTS, PD ADC, FD ADC), a particular environment condition (e.g., temperature), each of which may require a different mapping between the raw inputs and post-processed outputs. Post processing module 1402 further includes a routing logic 1616 and an output logic 1620. Routing logic 1616 can receive raw output 1624 from pixel cell 600 as well as programming data 1430, and determine which of lookup tables 1610, 1612, or 1614 to route raw output 1624 to. The determination can be based on, for example, an indication that raw output 1624 is from the TTS, PD ADC, or the FD ADC operation (e.g., based on the raw output being within a range of count values associated with TTS, PD ADC, or FD ADC, or based on other signals from pixel cell 600), environment condition (e.g., from programming data 1430), etc. Routing logic 1616 can also transmit an indication to output logic 1620 about which lookup table is selected to post-process raw output 1624. Based on the indication, output logic 1620 can forward an output from the selected lookup table as post-processed output 1630.

Figure 17:
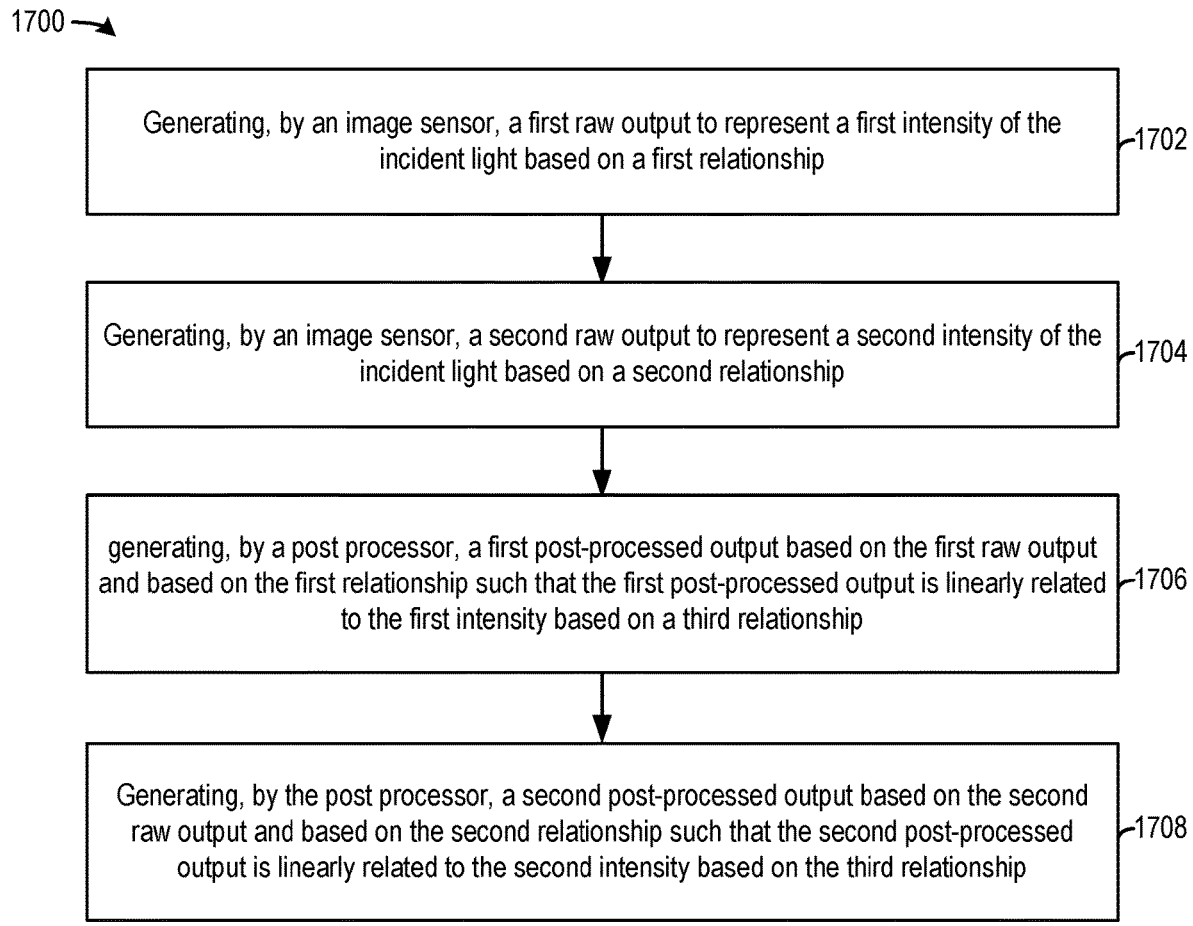
FIG. 17 illustrates a flowchart of an example process for measuring light intensity.

FIG. 17 illustrates a flowchart of an example method 1700 of measuring light intensity. Method 1700 can be performed by, for example, system 1400 including an image sensor (e.g., pixel cell 600) and a post-processing module 1402.

In step 1702, the image sensor can generate a first raw output to represent a first intensity of the incident light based on a first relationship. The first relationship can be associated with a first intensity range, such as an intensity range for the TTS operation, where the first raw output can measure a time of saturation of charge storage unit 600 of pixel cell 600.

In step 1704, the image sensor can generate a second raw output to represent a second intensity of the incident light based on a second relationship. The second relationship can be associated with a second intensity range different from the first intensity range. For example, the second intensity range can be an intensity range for the FD ADC operation or for the PD ADC operation. In the case of FD ADC operation, the second raw output can measure a quantity of overflow charge stored in charge storage unit 608 after the photodiode saturates when the charge storage unit 608 operates in a low gain mode (e.g., having an increased capacitance). In the case of PD ADC operation, the second raw output can measure a quantity of residual charge transferred from the photodiode to the charge storage unit 608 in a high gain mode (e.g., having a reduced capacitance).

In step 1706, the post processor can generate a first post-processed output based on the first raw output and based on the first relationship such that the first post-processed output is linearly related to the first intensity based on a third relationship. The third relationship can be a linear and uniform relationship between count values and the light intensity, such as an estimation of a quantity of charge generated by the photodiode with respect to the light intensity, such as the one shown in FIG. 13C. The first post-processed output can be determined based on a mapping between the first relationship and the third relationship, as described in FIG. 15C and Equation 12 for the TTS operation.

In step 1708, the post processor can generate a second post-processed output based on the second raw output and based on the second relationship such that the second post-processed output is linearly related to the second intensity based on the third relationship. The second post-processed output can be determined based on a mapping between the first relationship and the third relationship, as described in FIG. 15A and Equation 3 for a PD ADC operation, or as described in FIG. 15B and Equation 6 for a FD ADC operation.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   an image sensor configured to:
   generate a first raw output to represent a first intensity of incident light based on a first relationship, the first relationship being associated with a first intensity range, and
   generate a second raw output to represent a second intensity of incident light based on a second relationship, the second relationship being associated with a second intensity range; and
   a post processor configured to:
   determine a first dark charge value present in the first raw output, the first dark charge value being determined based on a first parameter based on the first intensity range;
   determine a second dark charge value present in the second raw output, the second dark charge value being determined based on a second parameter based on the second intensity range;
   generate a first post-processed output based on the first raw output, the first relationship, and a first component representing the first dark charge value, such that the first post-processed output is linearly related to the first intensity based on a third relationship, the first component being included in the generation of the first post-processed output based on the first intensity being in the first intensity range; and
   generate a second post-processed output based on the second raw output, the second relationship, and a second component representing the second dark charge value, such that the second post-processed output is linearly related to the second intensity based on the third relationship, the second component being included in the generation of the first post-processed output based on the second intensity being in the second intensity range.

2. The apparatus of claim 1, wherein:
the third relationship is associated with a third intensity range comprising the first intensity range and the second intensity range.

3. The apparatus of claim 1, wherein the image sensor comprises:
a photodiode configured to:
generate charge in response to incident light within an integration period, and
accumulate at least a part of the charge as residual charge until the photodiode saturates; and
a charge storage unit comprising one or more capacitors and configured to accumulate the remaining charge as overflow charge until the charge storage unit saturates.

4. The apparatus of claim 3, wherein the third relationship linearly relates a post-processed output with an estimated quantity of charge generated by the photodiode within the integration period.

5. The apparatus of claim 4,
wherein the first raw output measures a saturation time when the charge storage unit saturates before the integration period ends;
wherein the second raw output measures a quantity of the overflow charge accumulated by the charge storage unit within the integration period.

6. The apparatus of claim 5, wherein the post processor is configured to:
determine, based on the saturation time, a rate of accumulation of the overflow charge by the charge storage unit;
determine, based on the rate of accumulation of the overflow charge and the integration period, the estimated quantity of charge generated by the photodiode within the integration period; and
determine the first post-processed output based on the estimated quantity of charge.

7. The apparatus of claim 6, wherein the first dark charge value and the second dark charge value are determined based on a first quantity of dark current received by the charge storage unit and a second quantity of dark current received by the photodiode within the integration period.

8. The apparatus of claim 6, wherein the post processor is configured to determine the rate of accumulation of the overflow charge based on a first charge storage capacity of the charge storage unit and a second charge storage capacity of the photodiode.

9. The apparatus of claim 4, wherein the post processor is configured to:
determine the estimated quantity of charge based on the second raw output and a charge storage capacity of the photodiode; and
determine the second post-processed output based on the estimated quantity of charge.

10. The apparatus of claim 9, wherein the second dark charge value is determined based on a quantity of dark current received by the photodiode within the integration period.

11. The apparatus of claim 3,
wherein the first raw output measures a quantity of the overflow charge accumulated by the charge storage unit within the integration period; and
wherein the second raw output measures a quantity of the residual charge accumulated by the photodiode within the integration period.

12. The apparatus of claim 11, wherein the image sensor is configured to generate a third raw output to represent a third intensity of incident light, the third raw output measuring a saturation time when the charge storage unit saturates and is related to the third intensity of the incident light based on a fourth relationship; and
wherein the post processor is configured to generate a third post-processed output based on the third raw output and based on the fourth relationship such that the third post-processed output is linearly related to the third intensity based on the third relationship.

13. The apparatus of claim 11, wherein the charge storage unit has a configurable charge storage capacity;
wherein the image sensor is configured to store the overflow charge at the charge storage unit having a first charge storage capacity to generate the first raw output;
wherein the image sensor is configured to transfer the residual charge from the photodiode to the charge storage unit having a second charge storage capacity to generate the second raw output; and
wherein the first post-processed output is generated based on the first charge storage capacity and the second charge storage capacity.

14. The apparatus of claim 13, wherein the first dark charge value is determined based on a first quantity of dark current received by the charge storage unit and a second quantity of dark current received by the photodiode within the integration period for light of the first intensity range; and
wherein the second dark charge value is determined based on the second quantity of dark current received by the photodiode within the integration period for light of the second intensity range.

15. The apparatus of claim 1, wherein the post processor comprises one or more lookup tables that maps the first raw output to the first post-processed output and maps the second raw output to the second post-processed output; and
wherein the post processor is configured to generate the first post-processed output and the second post-processed output based on the one or more lookup tables.

16. The apparatus of claim 15, wherein the one or more lookup tables comprises a first lookup table that maps the first raw output to the first post-processed output and a second lookup table that maps the second raw output to the second post-processed output; and
wherein the post processor is configured to select the first lookup table based on the first intensity and to select the second lookup table based on the second intensity.

17. The apparatus of claim 16, wherein the first raw output and the second raw output are generated based on a non-uniform quantization process.

18. The apparatus of claim 7, wherein the first dark charge value is determined based on a relationship between a duration of the saturation time when the charge storage unit saturates and a duration of the integration period.

19. The apparatus of claim 1, wherein the first parameter and the second parameter are obtained from a calibration operation of the image sensor.

20. The apparatus of claim 1, wherein the image sensor is configured to measure the incident light in a first integration period to generate the first raw output, and to measure the incident light in a second integration period to generate the second raw output;

wherein the first dark charge value is determined based on a duration of the first integration period; and wherein the second dark charge value is determined based on a duration of the second integration period.

21. A method, comprising:

generating, by an image sensor, a first raw output to represent a first intensity of incident light based on a first relationship, the first relationship being associated with a first intensity range;

generating, by the image sensor, a second raw output to represent a second intensity of the incident light based on a second relationship, the second relationship being associated with a second intensity range;

determining, by a post processor, a first dark charge value present in the first raw output, the first dark charge value being determined based on a first parameter based on the first intensity range;

determining, by the post processor, a second dark charge value present in the second raw output, the second dark charge value being determined based on a second parameter based on the second intensity range;

generating, by the post processor, a first post-processed output based on the first raw output, the first relationship, and a first component representing the first dark charge value, such that the first post-processed output is linearly related to the first intensity based on a third relationship, the first component being included in the generation of the first post-processed output based on the first intensity being in the first intensity range; and generating, by the post processor, a second post-processed output based on the second raw output, the second relationship, and a second component representing the second dark charge value, such that the second post-processed output is linearly related to the second intensity based on the third relationship, the second component being included in the generation of the first post-processed output based on the second intensity being in the second intensity range.

22. The method of claim 21, further comprising:

generating, by the image sensor, a third raw output to represent a third intensity of incident light, wherein the third raw output measures a saturation time when a charge storage unit of the image sensor saturates and is related to the third intensity of the incident light based on a fourth relationship; and generating, by the post processor, a third post-processed output based on the third raw output and based on the fourth relationship such that the third post-processed output is linearly related to the third intensity based on the third relationship.

23. A non-transitory computer readable medium storing instructions that, when executed by a hardware processor, causes the hardware processor to:

receive, from an image sensor, a first raw output to represent a first intensity of incident light based on a first relationship, the first relationship being associated with a first intensity range;

receive, from the image sensor, a second raw output to represent a second intensity of the incident light based on a second relationship, the second relationship being associated with a second intensity range;

determine a first dark charge value present in the first raw output, the first dark charge value being determined based on a first parameter based on the first intensity range;

determine a second dark charge value present in the second raw output, the second dark charge value being determined based on a second parameter based on the second intensity range;

generate a first post-processed output based on the first raw output, the first relationship, and a first component representing the first dark charge value, such that the first post-processed output is linearly related to the first intensity based on a third relationship, the first component being included in the generation of the first post-processed output based on the first intensity being in the first intensity range; and generate a second post-processed output based on the second raw output, the second relationship, and a second component representing the second dark charge value, such that the second post-processed output is linearly related to the second intensity based on the third relationship, the second component being included in the generation of the first post-processed output based on the second intensity being in the second intensity range.

* * * * *